United States Patent Office 3,542,573
Patented Nov. 24, 1970

3,542,573
USE OF OXALIC ACID DIARYLAMIDES
AS LIGHT FILTERS
Hans Rudolf Biland, Basel, Max Duennenberger, Frenkendorf, and Christian Luethi, Muenchenstein, Switzerland, assignors to Ciba Limited, Basel, Switzerland, a company of Switzerland
No Drawing. Filed Dec. 6, 1966, Ser. No. 599,363
Claims priority, application Switzerland, Dec. 8, 1965, 16,894/65; Aug. 12, 1966, 11,666/66
Int. Cl. C08b 21/04; C08g 45/60, 51/60
U.S. Cl. 106—186
37 Claims

ABSTRACT OF THE DISCLOSURE

Compositions comprising an organic material having incorporated therein an ultraviolet absorbing agent in a proportion sufficient to protect said organic material from the influence of ultraviolet light, said ultraviolet absorbing agent being a symmetrical oxalic acid diarylamide of the formula

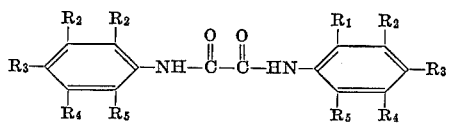

wherein $R_1$ to $R_5$ each represents a member selected from the group consisting of a hydrogen atom, halogen atom and a substituent, containing up to 20 carbon atoms, being selected from the group consisting of alkyl, substituted alkyl, benzene residue, benzyl group, a nitrile group, a possibly substituted alkoxy group, alkenyloxy group, an aliphatic acyl group, an aromatic acyl group, a group —O—CO—NH—X, —CO—NHX, —SO$_2$—NH—X (where X stands for hydrogen, alkyl or aryl), a group —COOY, a group —SO$_3$Y (where Y stands for hydrogen, alkyl, aryl, or a salt-forming cation), a nitro group, an amino group and an acylamino group, and the substituents $R_1$ and $R_2$ or $R_2$ and $R_3$ together with the benzene ring to which they are attached may form a fused-on six-membered carbocycle, and (a) each benzene nucleus contains at most two substituents selected from the group consisting of —O—CO—NH—X, —CO—NH—X, —SO$_2$—NH —X, —COOY, —SO$_3$Y, alkoxy and alkenyloxy,
(b) each benzene nucleus contains at most three other substituents different from hydrogen, and
(c) at least one of the substituents $R_1$ to $R_5$ is different from hydrogen, as well as the use of said oxalic acid diarylamides as ultraviolet absorbing agents.

Also included are the novel oxalic acid diamides of the formula

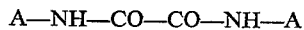
A—NH—CO—CO—NH—A in which A represents one of the residues

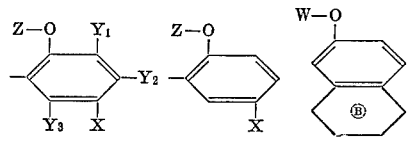

and in these residues Z represents a member selected from the group consisting of an alkyl group with 1 to 18 carbon atoms, an acyl group containing 1 to 12 carbon atoms, a benzyl group, a carbalkoxyalkyl group with a total of up to 12 carbon atoms, an allyl group and a halogenalkyl group with up to 8 carbon atoms; X represents a member selected from the group consisting of an alkyl group with up to 12 carbon atoms which is preferably branched, a halogen atom, a phenyl and a cyclohexyl group; $Y_1$ to $Y_3$ each stands for hydrogen, an alkyl or alkoxy group with 1 to 8 carbon atoms, or $Y_2$ may also represent a phenyl group; W represents an alkyl group with 1 to 18 carbon atoms or a carbalkoxyalkyl group with 1 to 8 carbon atoms, and B in the fused-on six-membered ring of the above partial formula indicates that this ring may be aromatic or hydroaromatic.

---

The present invention is concerned with the protection of organic materials, which may be damaged by the action of light, especially ultraviolet rays, in a variety of ways, from the action of such irradiation with the acid of certain oxalic acid diarylamide compounds. The invention further provides a type of new symmetrical oxalic acid diarylamides that have proved particularly suitable for this purpose.

While it is already known that certain oxalic acid bis-hydroxyarylamides are suitable as light filters against ultraviolet irradiation, it had been throught in the past that the light stability of such compounds is conditional upon the presence of a free hydroxyl group in ortho-position to the amide nitrogen. Contrary to this assumption it has now been found that a large group of oxalic acid diarylamides that do not conform with the said prerequisite are not only ultraviolet absorbers producing excellent results in industrial applications but, surprisingly, even display a higher light stability.

Accordingly, the present invention provides a process for protecting organic materials, which may be damaged by the action of light, from the action of light and especially ultraviolet rays by means of oxalic acid diarylamides free from hydroxyl groups, wherein symmetrical oxalic acid diarylamides of the formula (1) 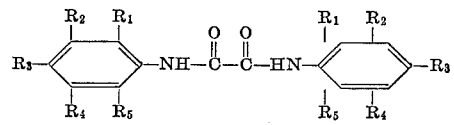

are homogeneously distributed in the organic materials to be protected, or applied to the surface of said materials, or the materials to be protected are placed underneath a filter layer incorporating the compounds defined. In the Formula 1 the symbols $R_1$ to $R_5$ each represents a hydrogen atom, a halogen atom, a substituent containing up to 20 carbon atoms from the series alkyl, substituted alkyl, benzene radical, benzyl group, a nitrile group, a possibly substituted alkoxy group, alkenyloxy group, an aliphatic or aromatic acyl group, one of the groups —O—CO—HN—X, —CO—NH—X or —SO$_2$—NH—X (where X stands for hydrogen, alkyl or aryl), a group —COOY or —SO$_3$Y (where Y stands for hydrogen, alkyl, aryl or a salt-forming cation), a nitro group, an amino group or an acylamino group. The substituents $R_1$ and $R_2$ or $R_2$ and $R_3$ together with the benzene ring to which they are attached may also form a fused on six-membered carbocycle, and where (a) each benzene nucleus contains at most two substituents —O—CO—NH—X, —CO—NH—X, —SO$_2$—NH—X, —COOY, —SO$_3$X, alkoxy or alkenyloxy,
(b) each benzene nucleus contains at most three of the other substituents different from hydrogen, and
(c) at least one of the substituents $R_1$ to $R_5$ is different from hydrogen.

Within the scope of the present definition halogen is, for example, above all chlorine or bromine; alkyl is a branched or linear alkyl radical having a small number of carbon atoms ($C_1$ to $C_4$) or higher alkyls containing 5 to 18 carbon atoms (for example octyl, dodecyl and the like), a substituted alkyl radical being chloralkyl, bromalkyl, hydroxyalkyl, alkenyloxyalkyl, carboxylated or carbalkoxyalkyl; a substituted alkoxy group is a halogenalkoxy, cyanalkoxy, hydroxyalkoxy, carbalkoxyalkoxy, —$SO_3X$ or a phenylalkoxy group; alkenyloxy is above all allyloxy; an acyl group is, for example, acetyl, butyryl, lauroyl, octadecanoyl, benzoyl, para-tertiary butylbenzyl or para-chlorobenzoyl; acylamino groups are acetylamino and benzoylamino; amino groups may also be substituted, being methylamino or ethylamino, as well as the anilino groups.

Within the scope of the Formula 1 there are specially important the symmetrical compounds of the formula (2) 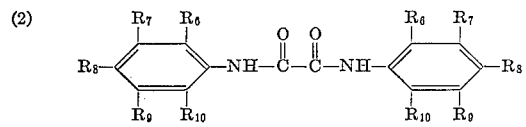

in which $R_6$ and $R_{10}$ are identical or different and each represents a hydrogen atom, a halogen atom, an alkyl or alkoxy group containing 1 to 18 carbon atoms, or a phenyl group, and in which (a) each benzene nucleus contains at most two alkoxy groups,
(b) each benzene nucleus contains at most three substituents different from hydrogen, and
(c) at least one of the substituents $R_6$ to $R_{10}$ is different from hydrogen.

In one variant of the process there are used compounds of the formula (3) 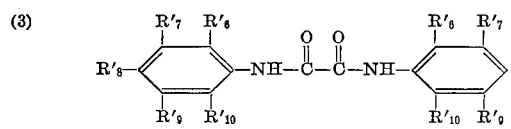

in which $R'_6$ to $R'_{10}$ are identical or different and each represents a hydrogen atom, an aliphatic or aromatic acyl groups —O—CO—HN—X, —CO—NH—X or

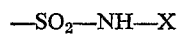

(where X stands for hydrogen, an alkyl group with 1 to 4 carbon atoms or phenyl), a group —COOY or —$SO_3Y$ (where Y is hydrogen, alkyl with 1 to 4 carbon atoms, phenyl, or an alkali metal, ammonium or amine salt ion) and where each benzene nucleus contains one or two of the above-mentioned substituents different from hydrogen and at least one of the substituents $R'_6$ to $R'_{10}$ is different from hydrogen.

In the case of the aniline or substituted aniline derivatives important compounds of the formula (4) 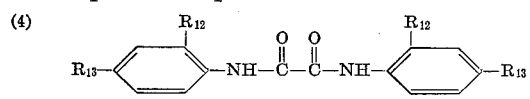

are of practical interest. In this formula $R_{12}$ and $R_{13}$ are identical or different and each represents chlorine, bromine, alkyl with 1 to 4 carbon atoms, alkoxy with 1 to 18 carbon atoms or a nitro group, or one of the substituents $R_{12}$ or $R_{13}$ represents a hydrogen atom, a carboxylic acid group, a carboxylic acid alkyl ester group containing 1 to 8 carbon atoms in its alkyl grouping, a sulphonic acid group or a sulphonamide group, or $R_{13}$ represents an etherified or acylated hydroxyl group which is etherified (especially alkyl ethers) or acylated with a residue containing 1 to 18 carbon atoms.

Some special variants of such types of compounds correspond to the following formulae (5) 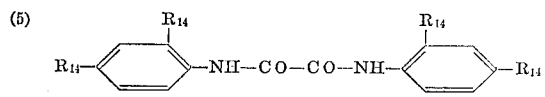

(6) 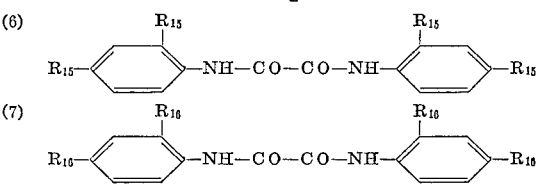

(7)

in which $R_{14}$ represents a hydrogen atom, or an alkoxy group with 1 to 18 carbon atoms, with the proviso that at least one residue $R_{14}$ per phenyl group represents such an alkoxy group, $R_{15}$ represents a hydrogen atom, a chlorine or bromine atom, with the proviso that at least one residue $R_{15}$ per phenyl group represents one of these halogen atoms, and $R_{16}$ represents a hydrogen atom or an alkyl group with 1 to 4 carbon atoms, with the proviso that at least one residue $R_{16}$ per phenyl group represents such an alkyl group.

Another type of compound suitable for protecting α-olefine polymers and polyvinylchloride corresponds to the general formula (8) 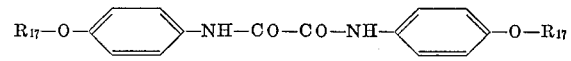

where $R_{17}$ is an alkyl group with up to 18 carbon atoms, a benzyl group, an acyl group or an allyl group.

In this group there are specially valuable also compounds of the formula (9) 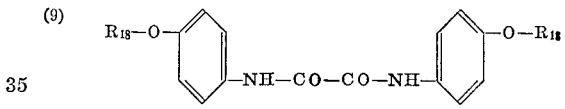

where $R_{18}$ represents a methyl, ethyl, octyl or octadecyl radical.

Of special importance to the process of the present invention are the new symmetrical oxalic acid diarylamides of the formula

A—NH—CO—CO—NH—A    (10)

in which formula A represents one of the residues

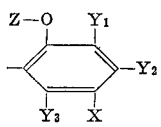 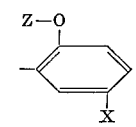 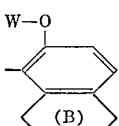

(10a)        (10b)        (10c)

in which Z represents a linear or branched alkyl group containing 1 to 18 carbon atoms, a possibly unsaturated acyl group with 1 to 12 carbon atoms, a benzyl group, a carbalkoxyalkyl group containing in all up to 12 carbon atoms, an allyl group, a halogenalkyl group with up to 8 carbon atoms; X represents an alkyl group with up to 12 carbon atoms which is preferably branched, a halogen atom, a phenyl group or a cyclohexyl group; $Y_1$ and $Y_3$ each represents hydrogen, an alkyl or alkoxy group with 1 to 8 carbon atoms or $Y_2$ may also represent a phenyl group; W stands for an alkyl group with 1 to 18 carbon atoms or a carbalkoxyalkyl group with 1 to 8 carbon atoms, and the symbol B in the fused-on six-membered ring of the above partial formula indicates that this ring may be of aromatic or hydroaromatic nature.

Of special value within the scope of the Formula 10 are those new compounds which correspond to the formula

(11) 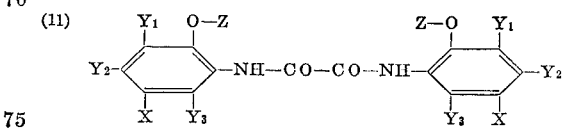

and more especially those new oxalic acid diarylamides which correspond to the formula

(12) 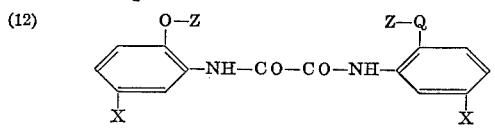

In the above Formulae 11 and 12 Z, X and $Y_1$ to $Y_3$ have the same meanings as in Formula 10. In Formula 11 preferably only one or two of the symbols $Y_1$ to $Y_3$ and X represent residues different from hydrogen atoms, as indicated above.

A subgroup of compounds of the above Formula 11 which are particularly valuable for practical use includes also those compounds of the Formula 11 as defined, in which, however, at least one of the substituents $Y_1$ or X or both these substituents represent a tertiary butyl group.

Specific groups of compounds according to the above general formulae correspond to the following formulae (where Z has the meaning defined above):

(13) 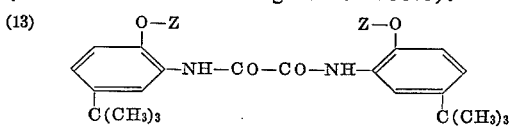

(14) 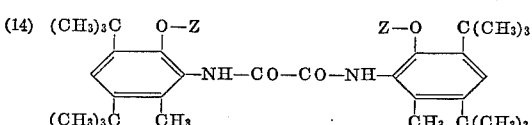

(15) 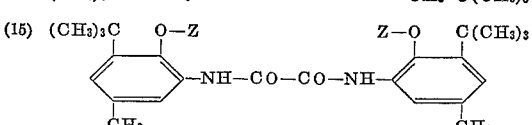

(16) 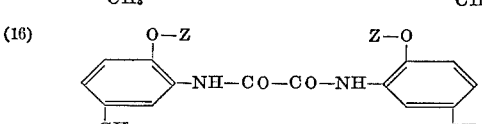

(17) 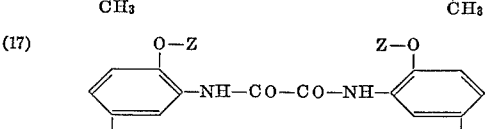

(18) 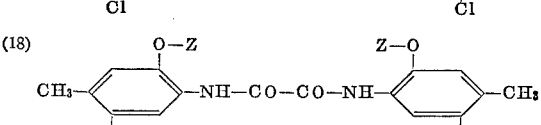

(19) 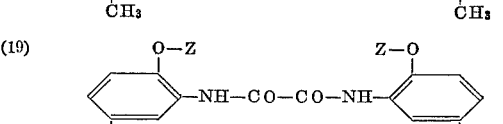

(20) 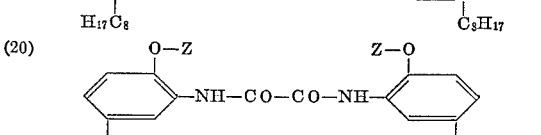

(21) 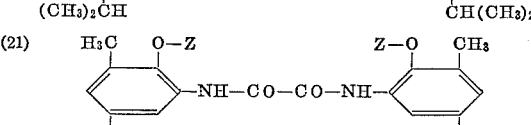

(22) 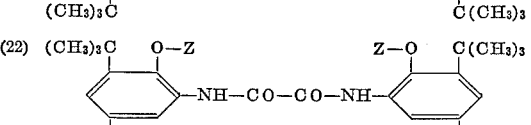

(23) 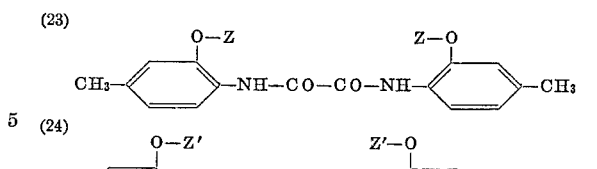

(24) 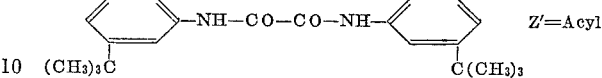 Z′=Acyl

(25) 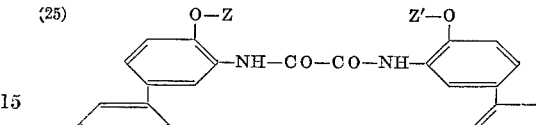

(26) 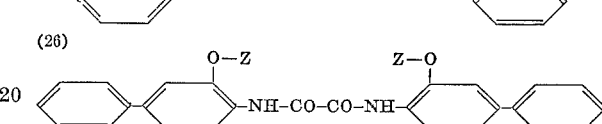

(27) 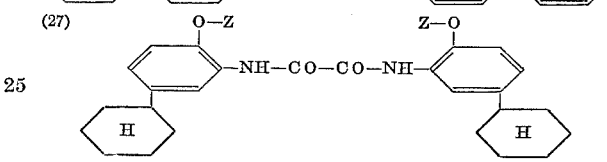

Of special importance are also oxalic acid diarylamides of the formula

(28) 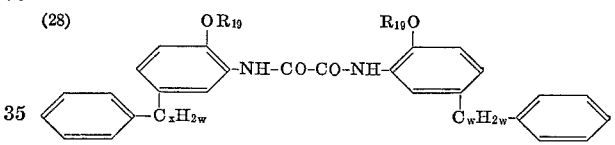

in which $w=1$, 2 or 3 and $R_{19}$ represents an alkyl radical with 1 to 12 carbon atoms; also oxalic acid diarylamides of the formula

(29) 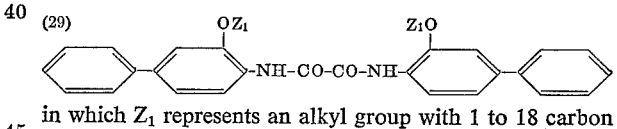

in which $Z_1$ represents an alkyl group with 1 to 18 carbon atoms or a halogenalkyl group.

From the group of the naphthylamine derivatives according to the general Formula 1 there may be mentioned, for example, those of the formula

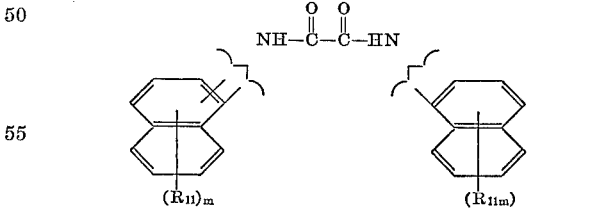

In this formula the brackets indicate that both α-naphthylamine and β-naphthylamine derivatives are possible; $R_{11}$ represents a hydrogen atom, a lower alkyl group with 1 to 4 carbon atoms, a sulphonic acid group or an etherified hydroxyl group; $m=1$ or 2 in the case of the sulphonic acid group, but otherwise it is 1.

From among the new naphthylamine derivatives there may be mentioned above all those which have already been described in connection with Formula 10, that is to say primarily compounds of the formula

(31) 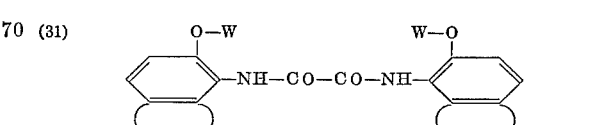

in which W represents an alkyl group with 1 to 18 carbon atoms or an carbalkoxyalkyl group with 1 to 8 carbon atoms, and n=1 or 2.

From the large variety of oxalic acid diarylamides that can be used in the process of this invention there may be mentioned the following non-limiting examples: Oxalic acid diarylamides derived from the under-mentioned anilines: aniline, 2-chloraniline, 4-chloraniline, 3-chloraniline, 2,4-dichloraniline, 3,4-dichloraniline, 2,4,6-trichloraniline and the corresponding bromoanilines, 2-, 3- and 4-fluoraniline, β- and 4-iodaniline, 3,5-diiodaniline, 2-, 3- and 4-methylaniline, 2,4- and 2,5-dimethylaniline, 2,6-diethylaniline, 2-methyl-5-isopropylaniline, 2-, 3- and 4-methoxyaniline, 2,4-diethoxyaniline, 4-butoxyaniline, 3-trifluoromethylaniline, 3,5-bis-trifluoromethylaniline, 2-, 3- and 4-nitraniline, 3- and 4-hydroxyaniline, 2-aminodiphenyl, meta-aminoacetanilide, para-aminoacetanilide, 3- and 4-aminobenzoic acid and their amides, anthranilic acid and its methyl and ethyl esters, para-amino-N,N-dimethylaniline, 4-amino-methylbenzoate and -ethylbenzoate, metanilic and sulphanilic acid, metanilamide and sulphanilamide, 4-hydroxy-3,5-di-tertiary butylaniline, 4-hydroxy-3,5-dichloraniline, 4,5-dichlorosulphanilic acid, 2-methoxy-5-methylaniline, 4-methyl-3-chloraniline, 2-chloro-4-trifluoromethylaniline, 2,4-dimethoxy-5-chloraniline and 2,4-dimethyl-6-nitraniline.

As amides derived from the naphthylamide series there may be mentioned: Amides of α-naphthylamine, β-naphthylamine and of the following sulphonic acids of the naphthylamine: 1-naphthylamine - 4-sulphonic acid, 1-naphthylamine-5-sulphonic acid, 1 - naphthylamine - 8-sulphonic acid, 2-naphthylamine - 5-sulphonic acid, 2-naphthylamine - 4,8-disulphonic acid, 2-naphthylamine-6,8-disulphonic acid, 8-hydroxy - 1-naphthylamine - 4-sulphonic acid, 8-hydroxy - 2-naphthylamine-6-sulphonic acid, 8-hydroxy - 1-naphthylamine - 4,6-disulphonic acid, 8-hydroxy - 1-naphthylamine - 3,6-disulphonic acid and 8-hydroxy-2-naphthylamine 3,6-disulphonic acid.

The oxalic acid bis-acrylamides of the general Formula 1 to be used according to this invention, are accessible by known methods, for example, by reacting oxalic acid compounds of the general formula (I)  Q—CO—CO—Q in which Q represents a halogen atom, such as chlorine, or the hydroxyl group or the —O—T group, T representing an aliphatic or aromatic hydrocarbon radical, preferably the methyl or ethyl group, with acrylamines of the benzene or naphthalene series corresponding to the formula (II)

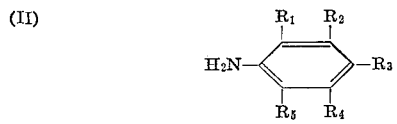

in which $R_1$ to $R_5$ have the meanings given in Formula 1 substantially in the molecular ratio of 1:2, at temperatures between 0 and 220° C. in solution or in a melt, in the presence of an inert solvent, such as benzene, dichlorobenzene, tetrachlorethane or diethylcarbitol, if desired or required in the presence of a catalyst, such as boric acid, the reaction being conducted in such manner that the hydrohalic acid, water, or alcohols or phenols are split off, and liquid byproducts are eliminated from the reaction mixture, preferably by azeotropic distillation.

Compounds in which the radicals $R_1$ to $R_5$ are ether or ester groups can also be obtained from intermediate products containing phenolic hydroxyl groups by subsequent etherification or esterification in per se conventional manner.

The compounds of the above Formulae 1 and the following are in principle suitable for stabilizing and protecting all those organic materials which are in any form damaged or destroyed upon exposure to ultraviolet rays. Such damage due to the effect of the same agent, namely ultraviolet irradiation, may have widely disparate results, for example, discoloration, changes in the mechanical properties (brittleness, fissuring, tear strength, flexural strength, abrasion resistance, elasticity, aging), triggering of undesired chemical reactions (decomposition of delicate chemical substances, for example medicaments), photochemically induced rearrangements, oxidation and the like (for example of oils containing unsaturated fatty acids) the causing of burns and irritation (for example on human skin) and the like.

Accordingly, the organic materials to be protected may belong to a wide variety of types of substances and be present in widely different processing stages and physical states, whereas they all have the common characteristic of being sensitive towards ultraviolet irradiation.

Organic materials of this kind may be of a high molecular or low molecular nature.

As non-limiting examples of low molecular and high molecular substances that can be protected or stabilized by the present process there may be mentioned:

Organic natural substances used for pharmaceutical purposes (medicaments), ultraviolet-sensitive dyestuffs, compounds which in the form of victuals or when present in victuals are decomposed by irradiation (unsaturated fatty acids in oils) and the like.

As examples of organic substances of high molecular weight there may be mentioned:

(I) Synthetic organic materials of high or higher molecular weight such as:

(a) Polymerization products based on organic compounds containing at least one polymerizable carbon-to-carbon double bond, that is to say their homopolymers or copolymers as well as their after-treating products, for example crosslinking, grafting or decomposition products; diluted polymers; modification products obtained by modifying reactive groupings in the polymer molecule and the like, for example polymers based on α,β-unsaturated carboxylic acids (for example, acrylates, acrylamides, acrylonitrile), of olefinic hydrocarbons, for example α-olefines, ethylene, propylene or dienes, that is to say also rubbers and rubber-like polymers (also so-called ABS polymers), polymers based on vinyl and vinylidene compounds (for example styrene, vinyl esters, vinylchloride, vinyl alcohol), of halogenated hydrocarbons, of unsaturated aldehydes and ketones, allyl compounds and the like;

(b) Other polymerization products obtainable, for example, by ring opening, for instance polyamides of the polycaprolactam type, also formaldehyde polymers, or polymers accessible by polyaddition or polycondensation, such as polyethers, polythioethers, polyacetals, thioplasts;

(c) Polycondensation products or precondensates based on bifunctional or polyfunctional compounds containing condensable groups, their homocondensates and cocondensates as well as their after after-treatment products, such, for example, as polyesters [saturated (e.g. polyethylene terephthalate) or unsaturated (e.g. maleic acid-dialcohol polycondensates and their crosslinked products with copolymerizable vinyl monomers), linear or branched (also those based on polyhydric alcohols, e.g. alkyd resins)], polyamides, (e.g. hexamethylenediamine adipate), maleinate resins, melamine resins, phenolic resins (e.g. novolaks), aniline resins, furan resins, carbamide resins and their precondensates and similarly constituted products; polycarbonates, silicone resins and the like.

(d) Polyadducts, such as polyurethanes (crosslinked and not crosslinked; epoxy resins.

(II) Semisynthetic organic materials, for example cellulose esters and mixed esters (cellulose acetate or propionate), nitrocellulose, cellulose ethers, regenerated cellulose (viscose rayon, cuprammonium cellulose) or their after-treatment products; casein synthetics.

(III) Natural organic materials of animal or vegetable origin, for example those based on cellulose or proteins such as wool, cotton, silk, bast, jute, hemp, pelts and hairs, leathers, finely divided wood pulp, natural resins (such as colophony, especially lacquer resins), gelatin, glues, also rubber, gutta percha, balata and their after-treatment and modification products, degradation products, products accessible by modification of reactive groups.

The organic materials concerned may be at widely differing stages of their processing (raw materials, semi-finished products or finished products) and physical states. They may be in the form of products shaped in a wide variety of ways, that is to say, for example, as predominantly three-dimensional objects such as sections, vessels or components of a great variety, chips or granules, foamed products; predominantly two-dimensional materials such as films, foils, lacquers, impregnations or coatings or predominantly unidimensional materials such as filaments, fibres, flocks, bristles or wires. The said materials may also be in unshaped states in a wide variety of homogeneous or inhomogeneous forms of distribution and physical states, for example in the form of powders, solutions, normal and reversed emulsions (creams), dispersions, latices, sols, gels, putties, waxes, adhesives or pore fillers, and the like.

Fibrous materials may be used in a wide variety of processing forms, for example as textile threads, yarns, fibre fleeces, padding, flocculated materials or as textile fabrics or textile laminates, knitwear, papers, cardboards and the like.

The new stabilizers may also be used, for example, as follows:

(a) in cosmetics, such as perfumes, dyed or undyed soaps and bath salts, skin and face creams, powders, repellants and especially sunburn oils and creams;
(b) in admixture with dyestuffs or pigments or as additives to dyebath, printing, discharge or reserve pastes, also for after-treating dyeings, prints or discharge prints;
(c) in admixture with so-called carriers, antioxidants, other light filters, heat stabilizers or chemical bleaches;
(d) in admixture with crosslinking agents or dressing agents such as starch or synthetically produced dressings;
(e) in combination with detergents (the detergents and stabilizers may, if desired, be added separately to the washing liquors);
(f) in gelatin layers used in photography;
(g) in combination with polymeric vehicles (products of polymerization, polycondensation or polyaddition) in which the stabilizers, if desired in addition to other substances, are incorporated in the dissolved or dispersed form, for example in coating, impregnating or binding agents (solutions, dispersions, emulsions) for textiles, fleeces, papers, leathers;
(h) as additives to a wide variety of industrial products to reduce the speed of their ageing, for example as additives to glues, adhesives, paints or the like.

If the protective compounds of this invention are to be used for the treatment of textile organic materials of natural or synthetic origin, for example textile fabrics, they may be applied to the substrate to be protected at any desired phase of the final processing of the latter, such as during a dressing or anticrease finishing or dyeing process or during any other finishing operation, by way of a fixing operation similar to a dyeing process.

Furthermore, the new stabilizers to be used according to this invention may be added to or incorporated with the materials prior to or during their shaping. Thus, for example, they may be added to the moulding or injection moulding compositions used in the manufacture of films, foils, tapes or mouldings, or they may be dissolved or dispersed or in any other way finely distributed in the spinning mass before it is spun. The protective compounds may also be added to the starting substances, reaction mixtures or intermediates used in the manufacture of fully synthetic or semisynthetic organic materials, that is to say also before or during the chemical reaction, for example in a polycondensation (including precondensates), in a polymerization (including prepolymers) or in a polyaddition.

An important sphere of application of the stabilizers to be used in the invention consists in incorporating these substances in a protective layer used to protect material placed underneath. This application may take the form of applying the ultraviolent absorber to the surface layer (of a film or of a fibre or of a multidimensional shaped object). This can be done for example similar to a dyeing process, or the active substance may be embedded in a polymer (polycondensate or polyadduct) film by one of the known surface coating methods with polymeric substances, or the active substance may be dissolved in a suitable solvent and caused to diffuse or swell into the surface layer. According to another important variant the ultraviolet absorber is embedded in a self-supporting, substantially two-dimensional carrier material, for example a foil or the wall of a vessel, in order to keep ultraviolet rays away from the substance located behind it (relevant examples: shop windows, films, transparent packages, bottles).

From the foregoing it is self-evident that in addition to the protection of the substrate or carrier material containing the ultraviolet absorber also other substances contained in the substrate or carrier material are protected, for example dyestuffs, antioxidants, disinfectants, antistatics and other dressing agents, plasticizers and fillers.

Depending on the type of substance to be protected or stabilized, on its sensitivity or the form in which the protection and stabilization is to be imparted, the requisite amount of stabilizer may vary within wide limits, for example from about 0.01 to 10% by weight, referred to the amount of substance to be protected. For most practical purposes, however, a quantity from about 0.05 to 2% will suffice.

Accordingly, as results from the foregoing, the process for protecting organic materials from the effect of ultraviolet radiation and heat consists in homogenously distributing a compound of one of the Formulae 1 to 31 in the organic material to be protected, or applying it to the surface of said material or coating the material to be protected with a filter layer containing one of the compounds mentioned.

In particular, this is advantageously done by homogeneously incorporating a compound of the Formulae 1 to 31 in substance or in the dissolved or dispersed form in an amount of 0.05 to 2.0% by weight (referred to the weight of the material to be protected) in the organic material to be protected before the latter undergoes its final shaping.

If the substance to be used according to this invention is to be applied to the surface of the substrate to be protected, thus for instance a fibrous material (fabric), this is advantageously done by immersing the substrate to be protected in a liquor in which the oxalic acid diarylamides are dissolved or dispersed. Suitable relevant solvents are, for example, methanol, ethanol, acetone, ethyl acetate, methylethylketone, cyclohexanol and above all water. The substrate to be treated is left in the liquor for some time, similar to the way that dyeing processes are carried out; as a rule, 10 minutes to 24 hours at 10° to 120° C. suffice, during which, if desired, the liquor may be agitated. Finally, the material is rinsed, if necessary washed, and dried.

In many cases it is of advantage to use the light filters mentioned above in combination with sterically hindered phenols or esters of thiodipropionic acid or organic phosphorus compounds. It is thus in many cases possible to achieve at the same time an anti-oxidation effect; above all, when compounds of the Formula 11 are used, synergistic effects are observed.

MANUFACTURING EXAMPLES AND INSTRUCTIONS

Unless otherwise indicated, parts and percentages in the following manufacturing examples and instructions are by weight.

Furthermore, unless otherwise shown in detail, alkyl groups (—$C_nH_{2n+1}$) are always n-alkyl groups.

(A) A mixture of 44 parts of oxalic acid diethyl ester and 74 parts of para-anisidine in 300 parts of dichlorobenzene is heated and stirred overnight at 150° C. under nitrogen. To complete the reaction, the temperature is then raised to 180° C. while at the same time distilling off the alcohol. On completion of the reaction, the batch is cooled, the precipitated product suctioned off and washed with benzene and petroleum ether, to yield 78 parts of a product of the formula (32)

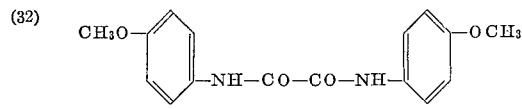

The analytically pure product, obtained by recrystallization from dimethylformamide, melts at 270 to 271° C.

Calculated for $C_{16}H_{16}O_4N_2$ (percent): C, 63.99; H, 5.37; N, 9.33. Found (percent): C, 64.10; H, 5.40; N, 9.51.

(B) 13.6 parts of the compound of the formula (33)

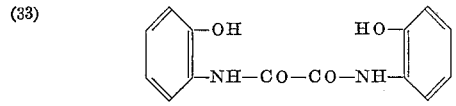

are suspended in 150 parts of chlorobenzene, and 15.3 parts of acetic anhydride are added.

The reaction mixture is then heated until all has dissolved. To complete the reaction the batch is refluxed for another 2 hours (addition of more acetic anhydride at the boil accelerates and completes the reaction).

The batch is cooled in an ice bath, mixed with 300 parts of methanol, and the precipitated product is suctioned off, to yield 15.05 parts melting at 181.5 to 185° C. After two recrystallizations the product of the formula (34)

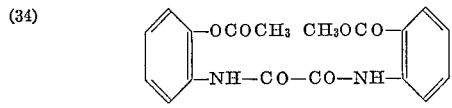

is obtained; in the analytically pure form it melts at 184 to 185° C.

Calculated (percent): C, 60.67; H, 4.53; N, 7.86. Found (percent): C, 60.37; H, 4.54; N, 7.88.

For the esterification of the phenolic hydroxyl group by the above method there may be used instead of anhydrides also aliphatic or aromatic acid chlorides.

(C) 27.2 parts of the compound of the formula (35)

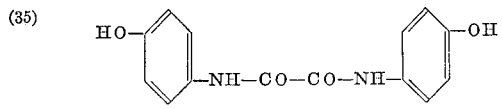

are taken up in 200 parts of dimethylsulphoxide and mixed with 28 parts of potassium carbonate and 40 parts of octylbromide, then stirred for 6 hours at 50 to 55° C. The reaction solution is then mixed with 200 parts of methanol and the precipitated product of the formula (36)

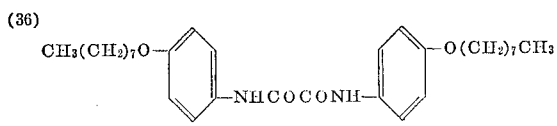

is suctioned off and washed with methanol. Yield: 33 parts. The analytically pure product melts at 214 to 215.5° C.

Calculated for $C_{30}H_{44}O_4N_2$ (percent): C, 72.54; H, 8.93; N, 5.64. Found (percent): C, 72.48; H, 8.85; N, 5.65.

(D) A mixture of 14.6 parts of oxalic acid diethyl ester, 32.2 parts of meta-trifluoromethylaniline and 1 part of boric acid is stirred for 5 hours at 170 to 175° C., with the alcohol formed being continuously distilled off. The melt is then dissolved in dimethylformamide and the product of the formula (37)

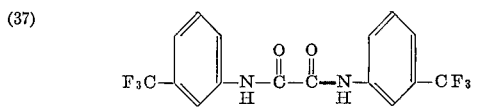

is precipitated with water. Yield: about 33 parts. The analytically pure product obtained by two recrystallizations from alcohol melts at 160 to 161° C. and reveals the following data:

Calculated for $C_{16}H_{10}O_2N_2F_6$ (percent): C, 51.08; H, 2.68; N, 7.45. Found (percent): C, 51.28; H, 2.57; N, 7.49.

(E) 29.7 parts of the compound (50) shown in Table A [prepared as described in Example A] are suspended in 400 parts of dimethylformamide and hydrogenated under atmospheric pressure in the presence of Raney nickel until the theoretical quantity of hydrogen has been absorbed (duration: 4½ hours; temperature raised up to 125° C.). The catalyst is filtered off and water is added at the boil until a turbidity appears. After cooling suctioning and drying there are obtained 22.9 parts of the compound of the formula (38)

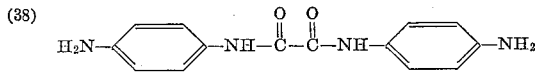

which melts at 276 to 278° C.

Calculated for $C_{14}H_{14}O_2N_4$ (percent): C, 62.21; H, 5.22; N, 20.73. Found (percent): C, 62.28; H, 5.30; N, 20.72.

(F) When in the method described in Example A the paraanisidine is replaced by the calculated quantity of paraaminobenzoic acid, the product (39)

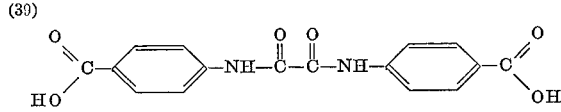

is obtained in a yield of 82%. It does not melt below 330° C. and reveals the following analytical data:

Calculated for $C_{16}H_{12}O_6N_2$ (percent): C, 58.54; H, 3.68; N, 8.53. Found (percent): C, 58.29; H, 3.68; N, 8.54.

89.3 parts of the above compound (39) are suspended in 650 parts of thionylchloride and 5 parts of dimethylformamide and stirred and refluxed for 7 hours, during which the finely granular suspension turns into crystalline needles without dissolving completely. The batch is cooled, rapidly suctioned and rinsed with petroleum ether. The crude product is dried for a short time in a vacuum cabinet and then boiled for 15 minutes with 1400 parts of dichlorobenzene. The undissolved matter is filtered off and the filtrate concentrated to ⅔ its volume. After cooling, the product in the form of needles is suctioned off and washed with petroleum ether, and dried, to yield 71.6 parts of the compound of the formula (40)

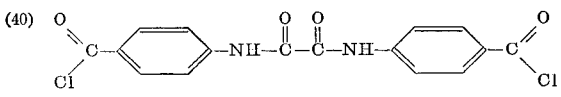

which melts at 280° C. with decomposition and reveals the following analytical data:

Calculated for $C_{16}H_{10}O_4Cl_2N_2$ (percent): C, 52.63; H, 2.76; N, 7.67; H, 19.42. Found (percent): C, 53.02; H, 2.80; N, 7.70; H, 18.98.

7.3 parts of the above compound (40) are dissolved in 250 parts of dichlorobenzene under reflux. The batch is cooled to 165° C., and at 160 to 165° C. a solution of 11 parts of ethylhexylamine in 120 parts of dichlorobenzene is stirred in dropwise. The immediately resulting suspension is stirred for another 5 hours at 160 to 165° C., then cooled, and the suspension is poured into 500 parts of water and subjected to steam distillation. Thus, after drying, there are obtained 10.4 parts of the product of the formula (41)

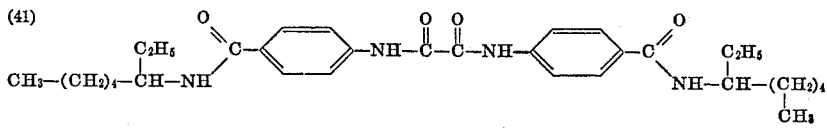

which, upon recrystallization from dimethylsulphoxide+alcohol, melts at 319 to 321° C. and reveals the following analysis:

Calculated for $C_{32}H_{46}O_4N_4$ (percent): C, 69.78; H, 8.42; N, 10.17. Found (percent): C, 69.81; H, 8.10; N, 10.09.

14.6 parts of the compound (40) are suspended in an autoclave in 200 parts of dichlorobenzene. 3.4 parts of liquid ammonia are poured in portionwise and the whole is allowed to react for 2 hours each at 120° C., 140° C. and 160° C. The suspension is then steam-distilled and the dried residue extracted for 15 minutes each with 200 parts of dichlorobenzene and then with 200 parts of dimethylformamide. The dried residue (5.5 parts) corresponds to the formula (42)

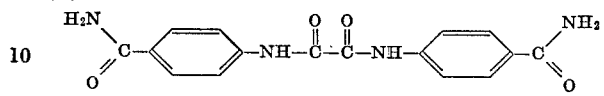

and does not melt below 350° C.

Calculated for $C_{16}H_{14}O_4N_4$ (percent): C, 58.89; H, 4.32; N, 17.17. Found (percent): C, 58.90; H, 4.34; N, 16.70.

The compounds listed in the following tables are accessible in an exactly analogous manner:

In the following Table A

Column I=formula number
Column II=structural formula
Column III=melting point (uncorrected) in 4° C.
Column IV=analytical data: CHN upper line "calculated" lower line "found."

A

| I | II | III | IV | | |
|---|---|---|---|---|---|
| 43 | (structure with -OCH₃, H₃CO-, -NH-C(O)-C(O)-HN-) | 252–254 | 63.99 / 63.99 | 5.37 / 5.36 | 9.33 / 9.43 |
| 44 | (H₃C- ... -CH₃, -N(H)-C(O)-C(O)-N(H)-) | 274.5–275 | 71.62 / 71.92 | 6.01 / 6.03 | 10.44 / 10.59 |
| 45 | (Cl- ... -Cl, -N(H)-C(O)-C(O)-N(H)-) | 295–295.5 | 54.39 / 54.21 | 3.26 / 3.18 | 9.06 / 9.08 |
| 46 | (H₃₇C₁₈O- ... -H₃₇C₁₈O) | 175–176 | 77.27 / 77.37 | 10.89 / 10.81 | 3.60 / 3.72 |
| 47 | (H₂₅C₁₂O- ... -H₂₅C₁₂O) | 191–192 | 74.71 / 74.80 | 10.23 / 9.96 | 4.59 / 4.80 |
| 48 | (O- ... -O, (CH₂)₃SO₃K on each side) | >300 | 40.53 / 40.78 | 3.74 / 4.01 | 4.73 / 4.70 |
| 49 | (Cl-, F₃C- ... -Cl, -CF₃) | 223–224 | 43.17 / 43.03 | 1.81 / 2.00 | 6.29 / 6.15 |
| 50 | (O₂N- ... -NO₂) | >360 | 50.91 / 50.99 | 3.05 / 3.18 | 16.97 / 17.14 |

| I | II | III | IV | | |
|---|---|---|---|---|---|
| 51 | 3,5-bis(CF₃)-C₆H₃-NH-CO-CO-NH-C₆H₃-3,5-(CF₃)₂ | 257–258 | 42.21 / 42.37 | 1.57 / 1.68 | 5.47 / 5.57 |
| 52 | 4-(H₅C₂OOC)-C₆H₄-NH-CO-CO-NH-C₆H₄-4-(COOC₂H₅) | 283–284 | 62.49 / 62.62 | 5.24 / 4.96 | 7.29 / 7.43 |
| 53 | 2-Naphthyl-NH-CO-CO-NH-2-Naphthyl | 279–280 | 77.63 / 77.65 | 4.74 / 8.42 | 8.23 / 8.20 |
| 54 | 3,4-Cl₂-C₆H₃-NH-CO-CO-NH-C₆H₃-3,4-Cl₂ | 220–223 | 44.48 / 44.60 | 2.13 / 2.10 | 7.41 / 7.15 |
| 55 | 2,3,4-Cl₃-C₆H₂-NH-CO-CO-NH-C₆H₂-2,3,4-Cl₃ | 270–271 | 37.62 / 37.80 | 1.35 / 1.33 | 6.27 / 6.46 |
| 56 | 2-CH₃-C₆H₄-NH-CO-CO-NH-C₆H₄-2-CH₃ | 215–216 | 71.62 / 71.35 | 6.01 / 5.99 | 10.44 / 10.69 |
| 57 | 2,3-(OCH₃)₂-5-Cl-C₆H₂-NH-CO-CO-NH-C₆H₂-5-Cl-2,3-(OCH₃)₂ | 338–339 | 50.37 / 50.09 | 4.23 / 4.14 | 6.53 / 6.78 |
| 58 | 2,4,5-(CH₃)₃-C₆H₂-NH-CO-CO-NH-C₆H₂-2,4,5-(CH₃)₃ | 228–229 | 72.95 / 73.13 | 6.80 / 6.84 | 9.45 / 9.56 |
| 59 | 2-CH₃-3-Cl-C₆H₃-NH-CO-CO-NH-C₆H₃-3-Cl-2-CH₃ | 255–256 | 56.99 / 56.98 | 4.18 / 4.17 | 8.31 / 8.42 |
| 60 | 4-(CH₃)₂N-C₆H₄-NH-CO-CO-NH-C₆H₄-4-N(CH₃)₂ | 313–314 | 66.23 / 66.37 | 6.79 / 6.92 | 17.17 / 17.30 |
| 61 | 2-Biphenyl-NH-CO-CO-NH-2-Biphenyl | 236–237 | 79.57 / 79.49 | 5.14 / 5.10 | 7.14 / 7.13 |
| 62 | 2,4-(OCH₃)₂-C₆H₃-NH-CO-CO-NH-C₆H₃-2,4-(OCH₃)₂ | 266–267 | 59.99 / 60.25 | 5.59 / 5.52 | 7.77 / 7.80 |
| 63 | 4-(C₆H₅CH₂O)-C₆H₄-NH-CO-CO-NH-C₆H₄-4-(OCH₂C₆H₅) | 278–279 | 74.32 / 74.06 | 5.35 / 5.38 | 6.19 / 6.13 |
| 64 | 4-(H₂C=CHCH₂O)-C₆H₄-NH-CO-CO-NH-C₆H₄-4-(OCH₂CH=CH₂) | 242–243 | 68.17 / 67.83 | 5.72 / 5.82 | 7.95 / 7.88 |

| I | II | III | IV | | |
|---|---|---|---|---|---|
| 65 | 4-(EtO-CO-CH₂-O)-C₆H₄-NH-CO-CO-NH-C₆H₄-(O-CH₂-CO-OEt)-4 | 221–222 | 59.45<br>59.20 | 5.44<br>5.41 | 6.30<br>6.55 |
| 66 | 4-(C₁₈H₃₇-O-CO-O)-C₆H₄-NH-CO-CO-NH-C₆H₄-(O-CO-O-C₁₈H₃₇)-4 | 208–209 | 74.96<br>74.65 | 10.16<br>9.85 | 3.36<br>3.45 |
| 67 | 4-(CH₃-CO-O)-C₆H₄-NH-CO-CO-NH-C₆H₄-(O-CO-CH₃)-4 | 312–313 | 60.55<br>60.67 | 4.53<br>4.59 | 7.86<br>8.04 |
| 68 | 3,4-(CH₃)₂-C₆H₃-NH-CO-CO-NH-C₆H₃-(CH₃)₂-3,4 | 194–195 | 72.95<br>72.92 | 6.80<br>6.78 | 9.45<br>9.53 |
| 69 | 4-Br-C₆H₄-NH-CO-CO-NH-C₆H₄-Br-4 | 321–322 | 42.24<br>42.01 | 2.53<br>2.40 | 7.04<br>7.06 |
| 70 | 2,4-(CH₃)₂-C₆H₃-NH-CO-CO-NH-C₆H₃-(CH₃)₂-2,4 | 215–216 | 65.14<br>64.98 | 6.83<br>7.03 | 6.33<br>6.47 |
| 71 | 4-(ClCH₂-CH₂-CH₂-O)-C₆H₄-NH-CO-CO-NH-C₆H₄-(O-CH₂-CH₂-CH₂Cl)-4 | 226–227 | 56.48<br>56.76 | 5.21<br>5.14 | 6.59<br>6.67 |
| 72 | 4-(C₄H₉-NH-CO-O)-C₆H₄-NH-CO-CO-NH-C₆H₄-(O-CO-NH-C₄H₉)-4 | 354–355 | 61.26<br>61.34 | 6.43<br>6.38 | 11.91<br>12.01 |
| 73 | 4-(C₄H₉-CH(C₂H₅)-CH₂-O)-C₆H₄-NH-CO-CO-NH-C₆H₄-(O-CH₂-CH(C₂H₅)-C₄H₉)-4 | 127–128 | | | |
| 74 | 4-(C₆H₅)-C₆H₄-NH-CO-CO-NH-C₆H₄-(C₆H₅)-4 | >350 | 79.57<br>79.45 | 5.14<br>5.18 | 7.14<br>7.25 |
| 75 | 4-(C₂H₅O)-C₆H₄-NH-CO-CO-NH-C₆H₄-(OC₂H₅)-4 | 266–267 | 65.84<br>66.05 | 6.14<br>6.18 | 8.53<br>8.54 |
| 76 | 4-(C₃H₇O)-C₆H₄-NH-CO-CO-NH-C₆H₄-(OC₃H₇)-4 | 264–265 | 67.39<br>67.28 | 6.79<br>6.74 | 7.86<br>7.62 |
| 77 | 4-(C₄H₉O)-C₆H₄-NH-CO-CO-NH-C₆H₄-(OC₄H₉)-4 | 234–235 | 68.72<br>68.96 | 7.34<br>7.37 | 7.29<br>7.39 |
| 78 | 2-(Cl(CH₂)₃-O)-C₆H₄-NH-CO-CO-NH-C₆H₄-(O-(CH₂)₃Cl)-2 | 143.5–144.5 | 56.48<br>56.56 | 4.21<br>4.92 | 6.59<br>6.65 |
| 79 | 2-(C₈H₁₇-O)-C₆H₄-NH-CO-CO-NH-C₆H₄-(O-C₈H₁₇)-2 | 85.5–86.5 | 72.54<br>72.70 | 8.93<br>8.75 | 5.64<br>5.67 |
| 80 | 2-(C₁₈H₃₇-O)-C₆H₄-NH-CO-CO-NH-C₆H₄-(O-C₁₈H₃₇)-2 | 97–98 | 77.27<br>77.59 | 10.89<br>10.85 | 3.60<br>3.69 |
| 81 | 2-(C₂H₅OOC-CH₂-O)-C₆H₄-NH-CO-CO-NH-C₆H₄-(O-CH₂-COOC₂H₅)-2 | 167.5–168.5 | 59.45<br>59.48 | 5.44<br>5.53 | 6.30<br>6.40 |
| 82 | 2-(C₆H₅-CH₂-O)-C₆H₄-NH-CO-CO-NH-C₆H₄-(O-CH₂-C₆H₅)-2 | 204–205 | 74.32<br>74.53 | 5.35<br>5.34 | 6.19<br>6.13 |

| I | II | III | IV | | |
|---|---|---|---|---|---|
| 83 | HO—CH₂CH₂—O—⟨phenyl⟩—NH—C(O)—C(O)—NH—⟨phenyl⟩—O—H₂C—H₂C—OH | 285–286 | 59.99<br>60.17 | 5.59<br>5.68 | 7.77<br>7.81 |
| 84 | CH₃—C(O)—NH—⟨phenyl⟩—NH—C(O)—C(O)—NH—⟨phenyl⟩—NH—C(O)—CH₃ | >310 | 61.01<br>61.14 | 5.12<br>5.00 | 15.81<br>15.86 |
| 85 | bis[2-ethoxy-4-(2-phenylpropan-2-yl)phenyl]oxamide | 178–179 | 76.56<br>76.83 | 7.14<br>7.26 | 4.96<br>4.99 |
| 86 | bis[2-octyloxy-4-(2-phenylpropan-2-yl)phenyl]oxamide | 88–89 | 78.65<br>78.83 | 8.80<br>8.63 | 3.82<br>3.89 |
| 87 | PhNH—C(O)—⟨phenyl⟩—NH—C(O)—C(O)—NH—⟨phenyl⟩—C(O)—NHPh | >350 | 70.28<br>69.83 | 4.63<br>4.73 | 11.71<br>11.58 |
| 88 | [Cl, OC₂H₅, H₃C, —NH—CO—]₂ | 288–290 | 54.42<br>54.67 | 4.57<br>4.65 | 7.05<br>7.24 |
| 89 | [OCH₃, CH₃O—, —NH—CO—]₂ | 241.5–242.5 | 59.99<br>60.28 | 5.59<br>5.61 | 7.77<br>7.74 |
| 90 | [OC₂H₅, C₂H₅O—, —NH—CO—]₂ | 180.5–181.5 | 63.44<br>63.45 | 6.78<br>6.80 | 6.73<br>6.44 |
| 91 | [N≡C—⟨phenyl⟩—NH—CO—]₂ | >370 | 66.20<br>66.18 | 3.47<br>3.59 | 19.30<br>19.38 |
| 92 | [⟨phenyl⟩—OC₂H₅, —NH—CO—]₂ | 171–172.5 | 65.84<br>66.08 | 6.14<br>6.34 | 8.53<br>8.57 |
| 93 | [⟨phenyl⟩—OC₁₂H₂₅, —NH—CO—]₂ | 86–87 | 74.95<br>74.71 | 9.93<br>9.86 | 4.60<br>4.63 |

| I | II | III | IV | | |
|---|---|---|---|---|---|
| 94 | [structure with OC4H9, NH-CO]2 | 123-124 | 68.72 / 68.44 | 7.34 / 7.28 | 7.29 / 7.28 |
| 95 | [naphthyl NH-CO]2 | 240.5-242 | 77.63 / 77.71 | 4.74 / 4.84 | 8.23 / 8.23 |
| 96 | [structure with CH3, OC8H17, H3C, NH-CO]2 | 142-143 | 73.87 / 74.12 | 9.48 / 9.51 | 5.07 / 4.99 |
| 97 | [structure with OCH3, H2N-O2S, NHCO]2 | >360 | 41.92 / 41.93 | 3.95 / 4.02 | 12.22 / 12.20 |

Tables B

In the following Tables B1 to B12 there are summarized compounds corresponding to Formulae 11 and 12, and 13 to 24 respectively. In these tables column I=formula number; column II=substituent Z in the preceding formula; column III=melting point (uncorrected) in °C.; and column IV=analytical data for C, H and N, the upper line being "calculated" and the lower line "found."

B1
(13)

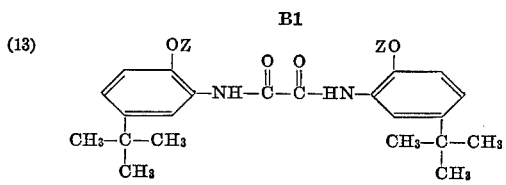

| I | II | III | IV | | |
|---|---|---|---|---|---|
| 98 | —C2H5 | 227-228 | 70.88 / 70.70 | 8.24 / 8.18 | 6.36 / 6.39 |
| 99 | —C4H9 | 155-156 | 72.54 / 72.57 | 8.93 / 9.17 | 5.64 / 5.60 |
| 100 | —C8H17 | 114-115 | 74.95 / 74.59 | 9.93 / 9.77 | 4.60 / 4.81 |
| 101 | —C12H15 | 79-80 | 76.62 / 76.71 | 10.62 / 10.58 | 3.89 / 3.87 |
| 102 | —C18H37 | 77-78 | 78.32 / 78.41 | 11.33 / 11.36 | 3.15 / 3.21 |
| 103 | —C(=O)—CH3 | 193-194 | 66.65 / 66.48 | 6.88 / 6.83 | 5.98 / 5.97 |
| 104 | —CH2—C6H5 | 243-244 | 76.56 / 76.50 | 7.14 / 7.18 | 4.96 / 4.83 |
| 105 | —CH2COOC2H5 | 123-124 | 64.73 / 64.45 | 7.24 / 7.24 | 5.03 / 4.88 |
| 106 | —CH2—CH=CH2 | 174-175 | 72.38 / 72.19 | 7.81 / 7.98 | 6.03 / 6.03 |
| 107 | —CH3 | 239-240 | 69.88 / 70.08 | 7.82 / 7.66 | 6.79 / 6.85 |
| 108 | —CH2—CH2—CH2Cl | 171-172 | 62.57 / 62.66 | 7.13 / 7.05 | 5.21 / 5.18 |
| 109 | —CH2—CH(C2H5)—C4H9 | 91-92 | 74.95 / 74.67 | 9.93 / 9.78 | 4.60 / 4.75 |

B2
(14)

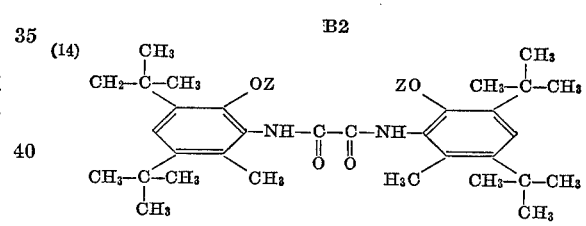

| I | II | III | IV | | |
|---|---|---|---|---|---|
| 110 | —CH3 | 280-281 | 73.87 / 74.01 | 9.48 / 9.30 | 5.07 / 5.17 |
| 111 | —C4H9 | 265-266 | 75.42 / 75.45 | 10.13 / 9.87 | 4.40 / 4.63 |
| 112 | —C8H17 | 223-224 | 76.95 / 77.10 | 10.76 / 10.57 | 3.74 / 3.83 |
| 113 | —C12H25 | 175-176 | 78.08 / 78.45 | 11.23 / 11.08 | 3.25 / 3.27 |

B3
(15)

[structure: CH3-C(CH3)2 with OZ, NH-C(=O)-C(=O)-HN, ZO, with C(CH3)3 and CH3 substituents]

| I | II | III | IV | | |
|---|---|---|---|---|---|
| 114 | —CH3 | 241-242 | 70.88 / 71.05 | 8.24 / 8.30 | 6.36 / 6.44 |
| 115 | —C4H9 | 217-218 | 73.25 / 73.21 | 9.22 / 9.28 | 5.34 / 5.50 |
| 116 | —C8H17 | 161-162 | 75.42 / 75.65 | 10.13 / 9.99 | 4.40 / 4.38 |
| 117 | —C12H25 | 139-140 | 77.16 / 77.06 | 10.52 / 10.51 | 3.75 / 3.88 |
| 118 | —C18H37 | 122-123 | 78.55 / 78.39 | 11.43 / 11.74 | 3.05 / 3.03 |
| 119 | —CH2—C6H5 | 236-237 | 77.26 / 77.33 | 7.17 / 7.46 | 4.74 / 4.73 |
| 120 | —CH2—COOC2H5 | 221-222 | 65.95 / 65.65 | 7.24 / 7.48 | 4.81 / 4.77 |

B4

(16) 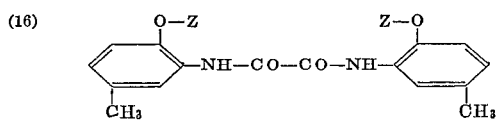

| I | II | III | IV | | |
|---|---|---|---|---|---|
| 121 | —CH₃ | 227.5–228.5 | 65.84 / 65.83 | 6.14 / 6.04 | 8.53 / 8.56 |
| 122 | —CH₂CH₂CH₂Cl | 165–166 | 58.28 / 58.54 | 5.78 / 5.89 | 6.18 / 6.20 |
| 123 | —C₈H₁₇ | 103–103.5 | 73.24 / 73.37 | 9.22 / 9.40 | 5.34 / 5.42 |
| 124 | —C₁₈H₃₇ | 100.5–101.5 | 77.56 / 77.63 | 11.00 / 10.80 | 3.48 / 3.70 |
| 125 | —CH₂COOC₂H₅ | 180–180.5 | 61.01 / 61.22 | 5.97 / 6.13 | 5.93 / 6.11 |
| 126 | —CH₂—C₆H₅ | 230–230.5 | 74.98 / 74.98 | 5.87 / 5.99 | 5.83 / 5.89 |
| 127 | —COCH₃ | 197–198 | 62.49 / 62.75 | 5.24 / 5.25 | 7.29 / 7.06 |
| 128 | —C₂H₅ | 185.5–186.5 | 67.39 / 67.33 | 6.79 / 6.67 | 7.86 / 7.93 |
| 129 | —CO(CH₂)₁₀—CH₃ | 100.5–101.5 | 72.25 / 72.00 | 9.10 / 9.16 | 4.21 / 4.00 |
| 130 | —CO—C₆H₅ | 236.5–237.5 | 70.85 / 71.14 | 4.76 / 4.77 | 5.51 / 5.51 |
| 131 | —CO—C₆H₄—C(CH₃)₃ | 229–230.5 | 73.52 / 73.89 | 6.50 / 6.52 | 4.51 / 4.50 |
| 132 | —COCH₂CH₂CH₃ | 145–146 | 65.44 / 65.19 | 6.41 / 6.28 | 6.36 / 6.35 |
| 133 | —COC₁₇H₃₅ | 98.5–99.5 | 74.96 / 74.94 | 10.16 / 10.42 | 3.36 / 3.42 |

B5

(17) 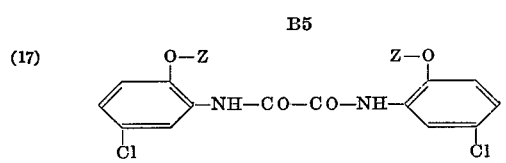

| I | II | III | IV | | |
|---|---|---|---|---|---|
| 134 | —CH₃ | 296–296.5 | 52.05 / 52.18 | 3.82 / 3.91 | 7.59 / 7.67 |
| 135 | —CH₂CH₂CH₂Cl | 175–176.5 | 48.61 / 48.45 | 4.08 / 4.18 | 5.67 / 5.63 |
| 136 | —C₈H₁₇ | 109.5–110 | 63.71 / 63.67 | 7.49 / 7.58 | 4.95 / 4.96 |
| 137 | —C₁₈H₃₇ | 96–97 | 70.98 / 71.09 | 9.77 / 9.98 | 3.31 / 3.36 |
| 138 | —CH₂COOC₂H₅ | 203–203.5 | 51.48 / 51.69 | 4.32 / 4.24 | 5.46 / 5.54 |
| 139 | —CH₂—C₆H₅ | 232–233.5 | 64.50 / 64.47 | 4.25 / 4.23 | 5.37 / 5.41 |

B6

(18) 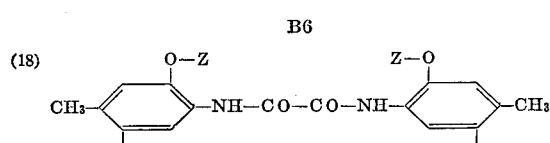

| I | II | III | IV | | |
|---|---|---|---|---|---|
| 140 | —CH₃ | 266–267.5 | 67.39 / 67.52 | 6.79 / 6.82 | 7.86 / 7.91 |
| 141 | —C₂H₅ | 237–238 | 68.72 / 68.95 | 7.34 / 7.26 | 7.29 / 7.26 |
| 142 | —CH₂CH₂CH₂Cl | 219.5–220.5 | 59.99 / 60.21 | 6.29 / 6.47 | 5.82 / 5.82 |
| 143 | —C₈H₁₇ | 128.5–129 | 73.87 / 74.15 | 9.48 / 9.58 | 5.07 / 5.22 |
| 144 | —C₁₈H₃₇ | 111.5–112 | 77.85 / 78.03 | 11.14 / 11.20 | 3.36 / 3.34 |

B7

(19) 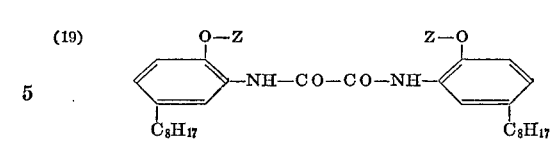

| I | II | III | IV | | |
|---|---|---|---|---|---|
| 145 | —CH₃ | 205–206.5 | 73.24 / 73.53 | 9.22 / 9.32 | 5.34 / 5.52 |
| 146 | —CH₂—C₆H₅ | 201–202 | 78.07 / 78.18 | 8.34 / 8.27 | 4.14 / 4.11 |
| 147 | —COCH₃ | 176.5–177.5 | 70.31 / 70.46 | 8.33 / 8.17 | 4.82 / 4.74 |
| 148 | —CH₂CH₂CH₂Cl | 139–140.5 | 66.55 / 66.60 | 8.38 / 8.37 | 4.31 / 4.29 |

B8

(20) 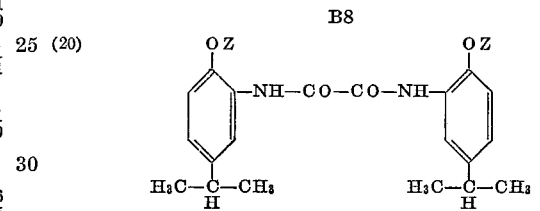

| I | II | III | IV | | |
|---|---|---|---|---|---|
| 149 | —CH₃ | 210–211 | 68.72 / 68.91 | 7.34 / 7.32 | 7.29 / 7.56 |
| 150 | —C₄H₉ | 180–181 | 71.76 / 71.84 | 8.60 / 8.46 | 5.98 / 5.93 |
| 151 | —C₈H₁₇ | 133–134 | 74.44 / 74.53 | 9.72 / 9.73 | 4.82 / 4.78 |
| 152 | —CH₂—C₆H₅ | 210–211 | 76.09 / 76.02 | 6.76 / 6.69 | 5.22 / 5.04 |

B9

(21) 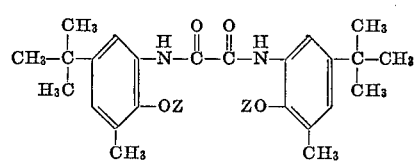

| I | II | III | IV | | |
|---|---|---|---|---|---|
| 153 | —CH₃ | 245–246 | 70.88 / 70.94 | 8.24 / 8.10 | 6.36 / 6.64 |
| 154 | —C₄H₉ | 153–154 | 73.24 / 73.18 | 9.22 / 9.19 | 5.34 / 5.30 |
| 155 | —C₈H₁₇ | 111–112 | 75.42 / 75.37 | 10.13 / 9.93 | 4.40 / 4.49 |
| 156 | —C₁₂H₂₅ | 91–92 | 76.95 / 77.20 | 10.76 / 10.74 | 3.74 / 3.63 |
| 157 | —C₁₈H₃₇ | 93–94 | 78.55 / 78.31 | 11.43 / 11.38 | 3.05 / 3.04 |
| 158 | —CH₂—C₆H₅ | 211–212 | 76.99 / 77.08 | 7.48 / 7.31 | 4.73 / 4.86 |
| 159 | —CH₂COOH₂H₅ | 156–157 | 65.73 / 65.93 | 7.59 / 7.53 | 4.79 / 4.81 |
| 160 | —C(O)—CH₃ | 221–222 | 67.72 / 67.77 | 7.31 / 7.19 | 5.64 / 5.54 |
| 161 | —C(O)—C₆H₅ | 259–260 | 73.52 / 73.82 | 6.50 / 6.71 | 4.51 / 4.45 |

(22) B10

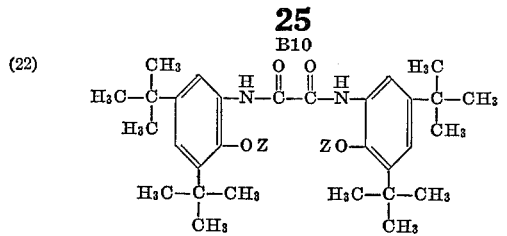

| I | II | III | IV | | |
|---|---|---|---|---|---|
| 162 | —CH₃ | 237–238 | 73.24 | 9.22 | 5.34 |
| 163 | —C₄H₉ | 176–177 | 75.45 / 75.13 | 9.33 / 9.76 | 4.63 / 4.78 |
| 164 | —C₈H₁₇ | 148–149 | 76.62 / 76.65 | 10.62 / 10.68 | 3.88 / 4.16 |
| 165 | —C₁₂H₂₅ | 108–109 | 77.83 / 78.09 | 11.13 / 11.19 | 3.36 / 3.38 |
| 166 | C₁₈H₃₇ | 80–81 | 79.14 / 79.13 | 11.67 / 11.60 | 2.80 / 2.86 |
| 167 | —CH₂COOC₂H₅ | 192–193 | 68.23 / 67.94 | 8.44 / 8.41 | 4.19 / 4.18 |

(23) B11

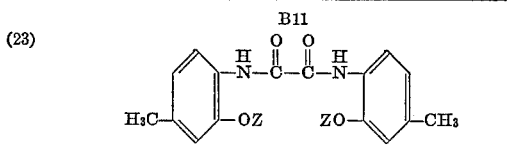

| I | II | III | IV | | |
|---|---|---|---|---|---|
| 168 | —CH₃ | 282–283 | 65.84 / 65.67 | 6.14 / 6.12 | 8.53 / 8.66 |
| 169 | —C₄H₉ | 163–164 | 69.88 / 69.84 | 7.82 / 7.87 | 6.79 / 6.80 |
| 170 | —C₈H₁₇ | 113–114 | 73.24 / 73.41 | 9.22 / 9.30 | 5.34 / 5.16 |
| 171 | —C₁₂H₂₅ | 100–101 | 75.42 / 75.24 | 10.13 / 10.05 | 4.40 / 4.33 |
| 172 | —C₁₈H₃₇ | 104–105 | 77.56 / 77.60 | 11.02 / 11.29 | 3.48 / 3.49 |
| 173 | —C(=O)—CH₃ | 195–196 | 62.49 / 62.68 | 5.24 / 5.24 | 7.29 / 7.16 |
| 174 | —C(=O)—C₆H₄—C(CH₃)₃ | 250–251 | 73.52 / 73.70 | 6.50 / 6.56 | 4.51 / 4.39 |
| 175 | —CH₂—C₆H₅ | 196–197 | 61.01 / 61.08 | 5.97 / 5.93 | 5.93 / 5.94 |
| 176 | —CH₂—C₆H₅ | 264–265 | 74.98 / 74.54 | 5.87 / 5.72 | 5.83 / 5.60 |
| 177 | —C(=O)—C₆H₅ | 231–232 | 70.85 / 70.87 | 4.76 / 4.66 | 5.51 / 5.52 |
| 178 | —C(=O)—C₁₁H₂₃ | 97–98 | 72.47 / 72.31 | 8.82 / 9.08 | 4.23 / 4.39 |
| 179 | —C(=O)—C₁₇H₃₅ | 99–100 | 74.96 / 75.23 | 10.16 / 10.21 | 3.36 / 3.56 |

(24) B12

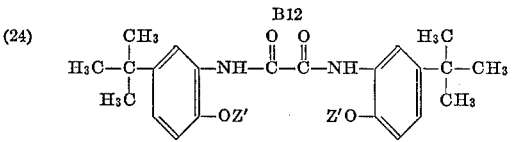

| I | II | III | IV | | |
|---|---|---|---|---|---|
| 180 | —C(=O)—CH₂—CH₂—CH₃ | 137–138 | 68.68 / 68.54 | 7.69 / 7.60 | 5.34 / 5.44 |
| 181 | —C(=O)—C₁₁H₂₃ | 80–81 | 73.36 / 73.65 | 10.17 / 9.80 | 3.72 / 3.83 |
| 182 | —C(=O)—C₆H₅ | 241–242 | 74.97 / 74.89 | 7.44 / 7.38 | 3.97 / 3.93 |
| 183 | —C(=O)—CH=CH₂ | 164–165 | 68.27 / 68.04 | 6.55 / 6.62 | 5.69 / 5.93 |
| 184 | —C(=O)—C₆H₄—C(CH₃)₃ | 220–221 | 72.95 / 72.70 | 6.12 / 6.06 | 4.73 / 4.53 |

Tables C

The following Tables C list compounds of the Formulae 10a and 10b and especially 25, 26 and 27.

In these tables column I=formula number; column II=substituent Z in the preceding formula; column III=melting point (uncorrected) in ° C. and column IV=analytical data for C, H and N, upper line "calculated," lower line "found."

(25) C1

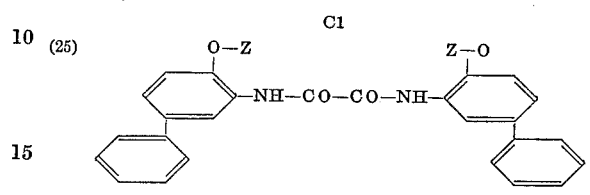

| I | II | III | IV | | |
|---|---|---|---|---|---|
| 185 | —CH₂—C₆H₅ | 289–290 | 79.45 / 78.90 | 5.33 / 5.32 | 4.63 / 4.47 |
| 186 | —C₂H₅ | 240–245 | 74.98 / 74.96 | 5.87 / 5.98 | 5.83 / 5.86 |
| 187 | —C₆H₅ | 252–264 | 75.94 / 76.17 | 4.46 / 4.53 | 4.43 / 4.57 |
| 188 | —CH₂CH₂CH₂Cl | 249–250 | 66.55 / 66.47 | 5.24 / 5.21 | 4.85 / 4.72 |
| 189 | —C₈H₁₇ | 181–182 | 77.74 / 77.65 | 8.08 / 8.03 | 4.32 / 4.42 |

(26) C2

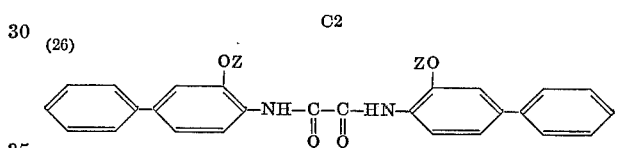

| I | II | III | IV | | |
|---|---|---|---|---|---|
| 190 | —CH₃ | 243–244 | 74.32 / 74.19 | 5.35 / 5.31 | 6.19 / 6.28 |
| 191 | —C₈H₁₇ | 153–154 | 77.74 / 77.47 | 8.08 / 8.03 | 4.32 / 4.28 |
| 192 | —C₁₂H₂₅ | 136–137 | 78.90 / 79.04 | 9.01 / 9.17 | 3.68 / 3.76 |
| 193 | —CH₂—CH₂—CH₂Cl | 198–199 | 66.55 / 66.83 | 5.24 / 5.22 | 4.85 / 4.93 |
| 194 | —C₄H₉ | 172–172.5 | 76.09 / 76.28 | 6.76 / 6.80 | 5.22 / 5.26 |
| 195 | —CO(CH₂)₁₀CH₃ | 170–170.5 | 76.11 / 76.34 | 8.18 / 8.31 | 3.55 / 3.51 |
| 196 | —COCH₃ | 216–217 | 70.85 / 71.01 | 4.76 / 4.80 | 5.51 / 5.44 |
| 197 | —CO—C₆H₅ | 143–143.5 | 75.94 / 75.97 | 4.46 / 4.57 | 4.43 / 4.48 |
| 98 | —COC₁₇H₃₅ | 140.5–141.5 | 77.78 / 77.66 | 9.27 / 9.32 | 2.93 / 3.21 |

(27) C3

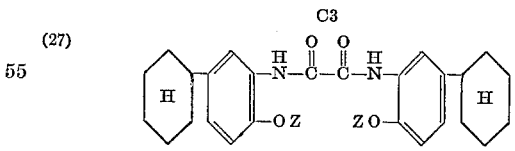

| I | II | III | IV | | |
|---|---|---|---|---|---|
| 199 | —CH₃ | 213–214 | 72.38 / 72.29 | 7.81 / 7.92 | 6.03 / 5.78 |
| 200 | —C₄H₉ | 236–237 | 74.41 / 74.48 | 8.82 / 8.91 | 5.11 / 5.14 |
| 201 | —C₈H₁₇ | 188–189 | 76.32 / 76.41 | 9.76 / 9.67 | 4.24 / 4.44 |
| 202 | —C₁₂H₂₅ | 162–163 | 77.67 / 77.77 | 10.43 / 10.16 | 3.62 / 3.72 |
| 203 | —C₁₈H₃₇ | 143–144 | 79.09 / 79.05 | 11.13 / 11.43 | 2.98 / 2.92 |
| 204 | —CH₂—C₆H₅ | 266–267 | 77.89 / 77.59 | 7.19 / 7.08 | 4.5 / 4.58 |
| 205 | —CH₂—COOC₂H₅ | 194–195 | 67.08 / 67.38 | 7.29 / 7.09 | 4.60 / 4.31 |
| 206 | —C(=O)—C₁₁H₂₃ | 165–166 | 74.96 / 75.00 | 9.56 / 9.55 | 3.50 / 3.56 |
| 207 | —C(=O)—CH₃ | 187–188 | 69.21 / 68.92 | 6.97 / 7.02 | 5.38 / 5.61 |

Tables D

The following Tables D list compounds of the Formula 10c or 31 respectively. In these tables column I= formula number; column II=meaning of residue W in the preceding formula; column III=melting point (uncorrected) in ° C. and column IV=analytical data for C, H and N, upper line "calculated," lower line "found."

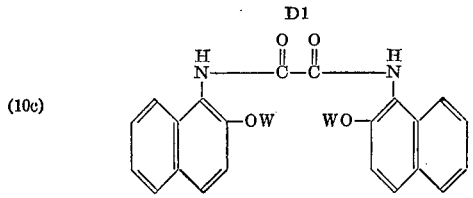

(10c)

D1

| I | II | III | IV | | |
|---|---|---|---|---|---|
| 208 | —CH₃ | 265–266 | 71.98 / 71.43 | 5.03 / 4.97 | 7.00 / 7.27 |
| 209 | —C₄H₉ | 180–181 | 74.35 / 74.19 | 6.66 / 6.59 | 5.78 / 5.78 |
| 210 | —C₈H₁₇ | 142–143 | 76.47 / 76.58 | 8.11 / 8.03 | 4.69 / 4.49 |
| 211 | —C₁₂H₂₅ | 138–139 | 77.92 / 77.76 | 9.10 / 9.17 | 3.95 / 4.10 |
| 212 | —C₁₈H₃₇ | 138–139 | 79.40 | 10.11 | 3.19 |
| 213 | —CH₂COOC₂H₅ | 197–198 | 66.17 / 65.90 | 5.18 / 5.21 | 5.14 / 5.39 |

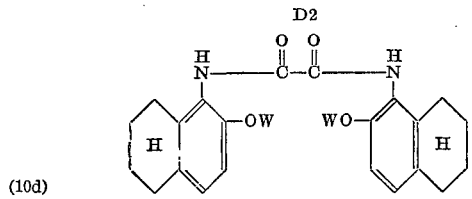

(10d)

D2

| I | II | III | IV | | |
|---|---|---|---|---|---|
| 214 | —CH₃ | 272–273 | 70.56 / 70.61 | 6.91 / 6.84 | 6.86 / 6.94 |
| 215 | —C₄H₉ | 225–226 | 73.14 / 72.88 | 8.18 / 8.00 | 5.59 / 5.77 |
| 216 | —C₈H₁₇ | 178–179 | | | |

EXAMPLES OF APPLICATION

Parts and percentages in the following examples are by weight unless otherwise indicated. In these examples typical representatives of each subgroup of compounds of this invention were used in each case. Quite generally, all compounds mentioned in the preceding description as well as their equivalents are equally suited though the solubility of the compound concerned in the substrate to be used must be taken into consideration or determined by means of a small-scale test. Finally, there should also be taken into consideration the fact that the absorption maximum of the compound to be incorporated is influenced by the substituents in the aromatic residue. For example, for protecting polyethylene and polyvinylchloride, the compounds of the general formula

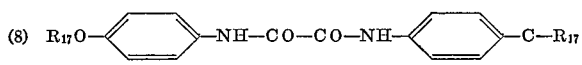

(8)

—in which $R_{17}$ represents an alkyl group with 1 to 18 carbon atoms, a benzyl, acyl or allyl group—have proved suitable.

Example 1

A film about 60µ thick was made from a 10% acetonic acetylcellulose solution containing 1% of the compound of the Formula 32 referred to acetylcellulose. After drying, the following percentual light transmission values are recorded:

| | Light transmission in percent | |
|---|---|---|
| Wavelength in mµ | Unexposed | film exposed for 100 hours in a fadeometer |
| 280–310 | 0 | 0 |
| 320 | 9 | 9 |
| 330 | 27 | 27 |
| 340 | 53 | 53 |
| 350 | 76 | 76 |
| 360 | 84 | 84 |

Similar results are obtained, for example, with the compounds of the Formulae 35, 43, 71, 75, 81, 98, 103 and 154 or other compounds of the invention mentioned in the description, provided these compounds are dissolved in acetylcellulose.

Example 2

A paste from 100 parts of polyvinylchloride, 59 parts by volume of dioctylphthalate and 0.5 part of the compound of the Formula 36 is rolled to and fro on a calender at 145 to 150° C. to form a foil about 0.5 mm. thick. The resulting polyvinylchloride foil absorbs completely in the ultraviolet region from 280 to 350 mµ.

Instead of the compound of the Formula 36 there may be used, for example, any one of the compounds of the Formulae 43, 44, 46, 47, 53, 57, 59, 62, 65, 71, 75, 81, 101, 110, 141, 155 or 162.

Example 3

A mixture of 100 parts of polyethylene and 0.2 part of the compound of the Formula 32 is rolled on a calender at 130 to 140° C. to form a foil which is then pressed at 150° C.

The polyethylene foil obtained in this manner is substantially impermeable to ultraviolet light within the region from 280 to 350 mµ.

Instead of the compound of the Formula 32 there may be used, for example, the compounds of the Formulae 36, 46, 47, 53, 99, 100 or 101.

Example 4

A mixture of 100 parts of polypropylene and 0.5 part of one of the compounds of the Formulae 98 to 120 or 153 to 167 is rolled into a sheet on a calender at 170° C., and the sheet is pressed at 230 to 240° C. under a maximum pressure of 40 kg./cm.² to form a panel 1 mm. thick.

The resulting panels are impermeable to ultraviolet light within the region from 280 to 350 mµ.

Example 5

0.5 part of the compound of the Formula 100 is dissolved in 1.8 parts of monostyrene and mixed with 0.5 part of a cobalt naphthenate solution in monostyrene (containing 1% of cobalt). 40 parts of an unsaturated polyester resin based on phthalic acid+maleic acid+ethyleneglycol in monostyrene are then added and the whole is stirred for 10 minutes. 1.7 parts of a catalyst solution (methylethylketone peroxide in dimethylphthalate) are dropped in and the well-stirred, air-free mass is poured in between two panes of glass. After about 20 minutes the polyester sheet of 1 mm. thickness has solidified sufficiently to enable it to be taken out of the mould. It is impermeable to ultraviolet light within the region from 280 to 350 mµ and displays no signs of yellowing after 1000 hours' exposure in a fadeometer (xeno test). If the compound (100) is omitted, yellowing in the xeno test appears already after 500 hours' exposure.

Instead of the compound of the Formula 100 there may be used, for example, any one of the compounds (101) to (120). The compounds (191) to (195) are equally advantageous.

Example 6

10,000 parts of a polyamide in chip form, prepared in known manner from caprolactam, are mixed with 30 parts of the compounds of the Formulae 65, 75, 83, 125 for 12 hours in a tumbler. The chips so treated are then melted in a boiler heated at 300° C., after the atmospheric oxygen has been displaced from it with superheated steam, and the melt is stirred for half an hour and then expressed under nitrogen of 5 atmospheres (gauge) through a spinneret. The resulting, cooled filament is wound on a spinning bobbin, whereby it is at the same time also stretched.

The addition of the above-mentioned compounds substantially inhibits the degradation of the macromolecules caused by exposure in the fadeometer and determined by measuring the relative viscosity in concentrated sulphuric acid.

Other compounds listed in the table display a similar behaviour.

Example 7

0.2 gram of the compound (34), (100) or (123) is dissolved in 10 g. of pure olive oil. The compounds dissolve rapidly and without heating. A 50μ thick layer of this solution absorbs ultraviolet light completely up to 340 mμ.

Other fatty oils and creams or emulsions used for cosmetics purposes may likewise be used for dissolving the above or other compounds mentioned in this patent.

Example 8

8 grams of a 65:35-mixture of toluylene-2,4-diisocyanate and toluylene-2,6-diisocyanate and 20 g. of a weakly branched polyester from adipic acid, diethyleneglycol and triol [hydroxyl number (60)] are stirred together for about 15 seconds. Then 2 ml. of a catalyst mixture (consisting of 6 ml. of a tertiary amine, 3 ml. of a dispersing agent, 3 ml. of a stabilizer and 2 ml. of water) and 0.28 g. of one of the compounds (100), (125), (147) or (193) are added and the whole is stirred for a short time. A foam fleece forms which after 30 minutes is placed in a water bath. After another 30 minutes it is thoroughly washed through with water and dried at room temperature.

The addition of one of the above-mentioned ultraviolet absorbers increases the stability on exposure in a xeno test apparatus. The above absorbers lend themselves equally well to incorporation in numerous other polyurethanes based on the isocyanate polyaddition process.

Other compounds listed in Tables A to D behave similarly.

Example 9

25 grams of distilled monostyrene are pre-polymerized in a closed bottle in a heating cabinet for 2 days at 90° C. 0.025 gram of benzoylperoxide, and 0.25 g. of one of the compounds (36), (73), (100), (193) or (86) are then slowly stirred in. The mixture is poured into a cube-shaped mould from aluminum foils and heated for 1 day at 70° C. When the mass has solidified and cooled completely, the mould is broken up. The block obtained in this manner is then pressed to form a panel 1 mm. thick in a hydraulic press at 138° C. under a pressure of 150 kg./cm.$^2$.

Polystyrene panels manufactured in this manner are impermeable to ultraviolet light within the region from 280 to 360 mμ.

The compounds of the Formulae 101 and 110 behave similarly.

Example 10

0.1 gram of one of the compounds (168), (89), (196) or (198) is dissolved in 40 g. of clear nitrocellulose lacquer of 25% strength. The lacquer is then applied with a doctor to maple boards and dries within a short time completely. The addition of one of the said ultraviolet absorbers to the lacquer does not change the colour shade of the wood. The light shade of the lacquered wood is not even changed by several days' exposure to the light of an ultraviolet lamp, provided the lacquer contains the above compounds in a concentration of about 1%. Untreated wood darkens after only a few days under the irradiation conditions described above.

Similar results are obtained with acrylic resin or alkyd melamine resin lacquers and other compounds mentioned in Tables A to C.

Example 11

12 grams of polyacrylonitrile are sprinkled into 88 g. of dimethylformamide until all has dissolved, then 0.1 g. of, for example, compound (36) is added, which dissolves immediately. The viscous substance is then applied to a clean pane of class and spread out with a film drawing bar. The coated pane is then dried in a vacuum drying cabinet at 120° C. under a vacuum of 150 mm. Hg. The resulting foil is about 0.05 mm. thick and is easy to detach from its support. The resulting foil is completely colourless and absorbs ultraviolet light up to a wavelength of 350 mμ practically completely, whereas a foil that does not contain the above compound of the Formula 36 passes at least 80% of the ultraviolet light. The compounds mentioned in connection with polystyrene are likewise suitable for incorporation with polyacrylonitrile.

What is claimed is:

1. A composition of matter substantially consisting of an organic material, which can be damaged by exposure to light, having incorporated therein an ultraviolet absorbing agent in a proportion sufficient to protect said organic material from the influence of ultraviolet light, said ultraviolet absorbing agent being a symmetrical oxalic acid diarylamide of the formula

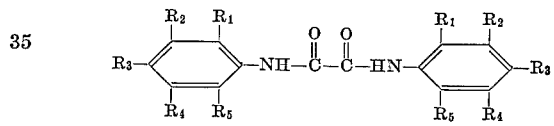

wherein $R_1$ to $R_5$ each represents a member selected from the group consisting of a hydrogen atom, halogen atom and a substituent, containing up to 20 carbon atoms, being selected from the group consisting of alkyl, chloralkyl, bromalkyl, hydroxyalkyl, alkenyloxyalkyl, carboxyalkyl, carbalkoxyalkyl, benzene residue, benzyl group, a nitrile group, an alkoxy group, a halogenalkoxy group, a cyanalkoxy group, a hydroxyalkoxy group, a carbalkoxyalkoxy group, a phenyl alkoxy group, alkenyloxy group, an aliphatic acyl group, an aromatic acyl group, a group

—O—CO—NH—X

—CO—NHX, —SO$_2$—NH—X (where X stands for hydrogen, alkyl or aryl), a group —COOY, a group —SO$_3$Y (where Y stands for hydrogen, alkyl, aryl, or a salt-forming cation), a nitro group, an amino group and an acylamino group, and the substituents $R_1$ and $R_2$ or $R_2$ and $R_3$ together with the benzene ring to which they are attached may form a fused-on six-membered carbocycle, and (a) each benzene nucleus contains at most two substituents selected from the group consisting of

—O—CO—NH—X, —CO—NH—X

—SO$_2$—NH—X, —COOY, —SO$_3$Y alkoxy and alkenyloxy, (b) each benzene nucleus contains at most three other substituents different from hydrogen, and (c) at least one of the substituents $R_1$ to $R_5$ is different from hydrogen.

2. Composition of matter as claimed in claim 1, wherein the oxalic acid diarylamide corresponds to the formula

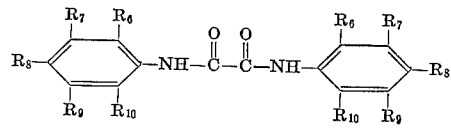

in which each of the substituents $R_6$ to $R_{10}$ may represent a member selected from the group consisting of a hydrogen atom, a halogen atom, an alkyl group and alkoxy group with 1 to 18 carbon atoms and a phenyl group, and
(a) each benzene nucleus contains at most two alkoxy groups,
(b) each benzene nucleus contains at most three other substituents different from hydrogen, and
(c) at least one of the substituents $R_6$ to $R_{10}$ is different from hydrogen.

3. Composition of matter as claimed in claim 1, whereing the oxalic acid diarylamide corresponds to the formula

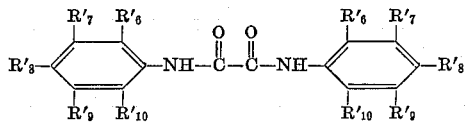

in which each of the substituents $R'_6$ to $R'_{10}$ represents a member selected from the group consisting of a hydrogen atom, an aliphatic acyl group and an aromatic acyl group containing 1 to 12 carbon atoms, one of the groups

—O—CO—NH—X, —CO—NH—X and

—SO$_2$—NH—X (where X stands for hydrogen an alkyl group with 1 to 4 carbon atoms or phenyl), a group —COOY and —SO$_3$Y (where Y is hydrogen, alkyl with 1 to 4 carbon atoms, phenyl, or an alkali metal, ammonium or amine salt ion) and where each benzene nucleus contains one to two of the above-mentioned substituents different from hydrogen and at least one of the substituents $R'_6$ to $R'_{10}$ is different from hydrogen.

4. Composition of matter as claimed in claim 1, wherein the oxalic acid diarylamide corresponds to the formula

A—NH—CO—CO—NH—A in which A represents one of the residues selected from the group consisting of

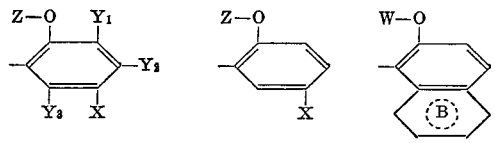

in which Z represents a member selected from the group consisting of a linear and a branched alkyl group containing 1 to 18 carbon atoms, a saturated or unsaturated acyl group with 1 to 12 carbon atoms, a benzyl group, a carbalkoxyalkyl group containing in all up to 12 carbon atoms, an allyl group, a halogenalkyl group with up to 8 carbon atoms; X represents a member selected from the group consisting of an alkyl group with up to 12 carbon atoms which is preferably branched, a halogen atom, a phenyl group and a cyclohexyl group; $Y_1$ to $Y_3$ each represents a member selected from the group consisting of hydrogen, an alkyl and an alkoxy group with 1 to 8 carbon atoms and $Y_2$ may also represent a phenyl group; W stands for an alkyl group with 1 to 18 carbon atoms or a carbalkoxyalkyl group with 1 to 8 carbon atoms, and the symbol B in the fused-on six-membered ring of the above partial formula indicates that this ring may be of aromatic or hydroaromatic nature.

5. Composition of matter as claimed in claim 1, wherein the oxalic acid diaryl-amide corresponds to the formula

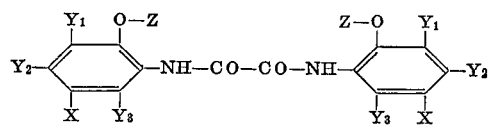

in which Z represents a member selected from the group consisting of an alkyl group with 1 to 18 carbon atoms, an acyl group with 1 to 12 carbon atoms, a benzyl group, a carbalkoxyalkyl group with a total of up to 12 carbon atoms, an allyl group and a halogenalkyl group with up to 8 carbon atoms; X represents a member selected from the group consisting of an alkyl group with up to 12 carbon atoms, a halogen atom, a phenyl group and a cyclohexyl group, and $Y_1$ to $Y_3$ each stands for hydrogen or an alkyl or alkoxy group with 1 to 8 carbon atoms, or $Y_2$ may also be a phenyl group.

6. Composition of matter as claimed in claim 1, wherein the oxalic acid diarylamide corresponds to the formula

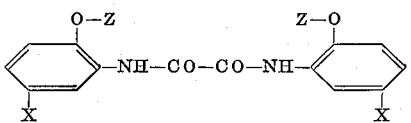

in which Z represents a member selected from the group consisting of an alkyl group with 1 to 18 carbon atoms, an acyl group with 1 to 12 carbon atoms, a benzyl group, a carbalkoxyalkyl group with a total of up to 12 carbon atoms, an allyl group, a halogenalkyl group with up to 8 carbon atoms, and X represents a member selected from the group consisting of a preferably branched alkyl group with up to 12 carbon atoms, a halogen atom, a phenyl group and a cyclohexyl group.

7. Composition of matter as claimed in claim 1, wherein the oxalic acid diarylamide corresponds to the formula

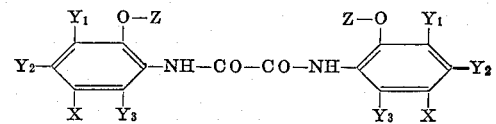

in which Z represents a member selected from the group consisting of an alkyl group with 1 to 18 carbon atoms, an acyl group with 1 to 12 carbon atoms, a benzyl group, a carbalkoxyalkyl group with a total of up to 12 carbon atoms, an allyl group, a halogenalkyl group with up to 8 carbon atoms, and X represents a member selected from the group consisting of an alkyl group with up to 12 carbon atoms which is preferably branched, a halogen atom, a phenyl group and a cyclohexyl group, $Y_1$ to $Y_3$ each stands for hydrogen, an alkyl or alkoxy group with 1 to 8 carbon atoms, or $Y_2$ may also stand for a phenyl group, with the proviso that at least one substituent $Y_1$ or X or both these substituents represent a tertiary butyl group.

8. Composition of matter as claimed in claim 1, wherein the oxalic acid diarylamide corresponds to the formula

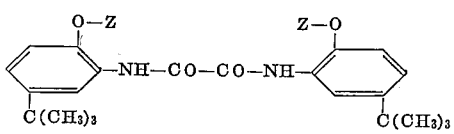

in which Z represents a member selected from the group consisting of an alkyl group with 1 to 18 carbon atoms, an acyl group containing 1 to 12 carbon atoms, a benzyl group, a carbalkoxyalkyl group with a total of up to 12 carbon atoms, an allyl group and a halogenalkyl group with up to 8 carbon atoms.

9. Composition of matter as claimed in claim 1, wherein the oxalic acid diarylamide corresponds to the formula

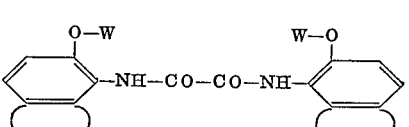

in which W represents an alkyl group with 1 to 18 carbon atoms or a carbalkoxyalkyl group with 1 to 8 carbon atoms, and $n$ stands for 1 to 2.

10. Composition of matter as claimed in claim 1, wherein the oxalic acid diarylamide corresponds to the formula

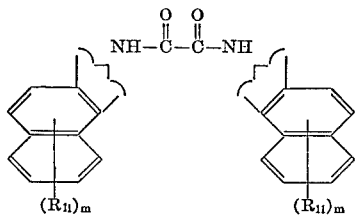

in which $R_{11}$ represents a hydrogen atom, a sulphonic acid group a hydroxyl group or etherified hydroxyl group and in the case of the sulphonic acid group $m=1$ or 2, otherwise $m=1$.

11. Composition of matter as claimed in claim 1, wherein the oxalic acid diarylamide corresponds to the formula

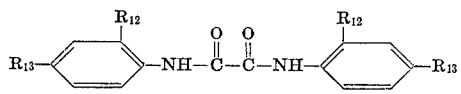

in which $R_{12}$ and $R_{13}$ are identical or different and each represents a member selected from the group consisting of chlorine, bromine, alkyl with 1 to 4 carbon atoms, alkoxy with 1 to 18 carbon atoms and a nitro group, and one of the substituents $R_{12}$ and $R_{13}$ represent a member selected from the group consisting of a hydrogen atom, a carboxylic acid group, a carboxylic acid alkyl ester group containing 1 to 8 carbon atoms in its alkyl grouping, a sulphonic acid group and a sulphonamide group, or $R_{13}$ represents a member selected from the group consisting of an etherified hydroxyl group, and an acylated hydroxyl group, said groups being etherified or acylated with a residue containing 1 to 18 carbon atoms.

12. Composition of matter as claimed in claim 1, wherein the oxalic acid diarylamide corresponds to the formula

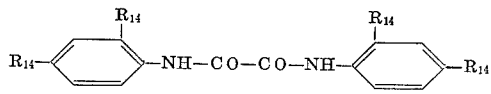

in which $R_{14}$ stands for a hydrogen atom or an alkoxy group with 1 to 18 carbon atoms, with the proviso that at least one residue $R_{14}$ per phenyl group represents such an alkoxy group.

13. Composition of matter as claimed in claim 1, wherein the oxalic acid diarylamide corresponds to the formula

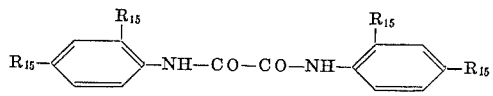

in which $R_{15}$ stands for a hydrogen atom, a chlorine atom or a bromine atom, with the proviso that at least one residue $R_{15}$ per phenyl group represents one of the halogen atoms mentioned.

14. Composition of matter as claimed in claim 1, wherein the oxalic acid diarylamide corresponds to the formula

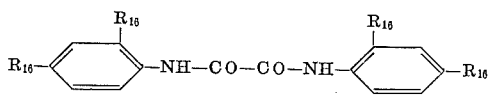

in which $R_{16}$ represents a hydrogen atom or an alkyl group with 1 to 4 carbon atoms, with the proviso that at least one residue $R_{16}$ per phenyl group represents such an alkyl group.

15. Composition of matter as claimed in claim 1, wherein the oxalic acid diarylamide corresponds to the formula

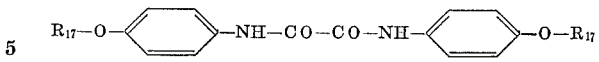

in which $R_{17}$ represents an alkyl group with 1 to 18 carbon atoms, a benzyl, acyl or allyl group.

16. Composition of matter as claimed in claim 1, wherein the oxalic acid diarylamide corresponds to the formula

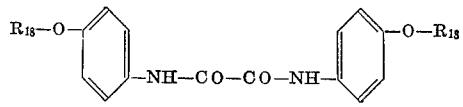

is used, in which $R_{18}$ represents a methyl, ethyl, octyl or octadecyl radical.

17. A composition of matter as claimed in claim 1, wherein the symmetrical oxalic acid diarylamide is incorporated homogeneously with the organic materials to be protected in an amount from 0.05 to 2.0% by weight, referred to the weight of the material to be protected, before the material is given its final shape.

18. A composition of matter as claimed in claim 1, wherein the organic material to be protected is a material selected from the group consisting of acetylcellulose, polyvinylchloride, a poly-α-olefine, a synthetic polyamide and copolymers of an unsaturated polyester.

19. Process for protection of organic materials from the influence of ultraviolet radiation by incorporating in said materials an oxalic acid diarylamide as defined in claim 1 in a proportion sufficient to protect said organic materials from the influence of ultraviolet radiation.

20. Process for protection of organic materials from the influence of ultraviolet radiation by incorporating in said materials an oxalic acid diarylamide as defined in claim 2 in a proportion sufficient to protect said organic materials from the influence of ultraviolet radiation.

21. Process for protection of organic materials from the influence of ultraviolet radiation by incorporating in said materials an oxalic acid diarylamide as defined in claim 3 in a proportion sufficient to protect said organic materials from the influence of ultraviolet radiation.

22. Process for protection of organic materials from the influence of ultraviolet radiation by incorporating in said materials an oxalic acid diarylamide as defined in claim 4 in a proportion sufficient to protect said organic materials from the influence of ultraviolet radiation.

23. Process for protection of organic materials from the influence of ultraviolet radiation by incorporating in said materials an oxalic acid diarylamide as defined in claim 5 in a proportion sufficient to protect said organic materials from the influence of ultraviolet radiation.

24. Process for protection of organic materials from the influence of ultraviolet radiation by incorporating in said materials an oxalic acid diarylamide as defined in claim 6 in a proportion sufficient to protect said organic materials from the influence of ultraviolet radiation.

25. Process for protection of organic materials from the influence of ultraviolet radiation by incorporating in said materials an oxalic acid diarylamide as defined in claim 7 in a proportion sufficient to protect said organic materials from the influence of ultraviolet radiation.

26. Process for protection of organic materials from the influence of ultraviolet radiation by incorporating in said materials an oxalic acid diarylamide as defined in claim 8 in a proportion sufficient to protect said organic materials from the influence of ultraviolet radiation.

27. Process for protection of organic materials from the influence of ultraviolet radiation by incorporating in said materials an oxalic acid diarylamide as defined in claim 9 in a proportion sufficient to protect said organic materials from the influence of ultraviolet radiation.

28. Process for protection of organic materials from the influence of ultraviolet radiation by incorporating in said materials an oxalic acid diarylamide as defined in claim 10 in a proportion sufficient to protect said organic materials from the influence of ultraviolet radiation.

29. Process for protection of organic materials from the influence of ultraviolet radiation by incorporating in said materials an oxalic acid diarylamide as defined in claim 11 in proportion sufficient to protect said organic materials from the influence of ultraviolet radiation.

30. Process for protection of organic materials from the influence of ultraviolet radiation by incorporating in said materials an oxalic acid diarylamide as defined in claim 12 in a proportion sufficient to protect said organic materials from the influence of ultraviolet radiation.

31. Process for protection of organic materials from the influence of ultraviolet radiation by incorporating in said materials an oxalic acid diarylamide as defined in claim 13 in a proportion sufficient to protect said organic materials from the influence of ultraviolet radiation.

32. Process for protection of organic materials from the influence of ultraviolet radiation by incorporating in said materials an oxalic acid diarylamide as defined in claim 14 in a proportion sufficient to protect said organic materials from the influence of ultraviolet radiation.

33. Process for protection of organic materials from the influence of ultraviolet radiation by incorporating in said materials an oxalic acid diarylamide as defined in claim 15 in a proportion sufficient to protect said organic materials from the influence of ultraviolet radiation.

34. Process for protection of organic materials from the influence of ultraviolet radiation by incorporating in said materials an oxalic acid diarylamide as defined in claim 16 in a proportion sufficient to protect said organic materials from the influence of ultraviolet radiation.

35. Process for protection of organic materials from the influence of ultraviolet radiation by incorporating in said materials an oxalic acid diarylamide as defined in claim 1 in an amount from 0.05 to 2.0% by weight, referred to the weight of the material to be protected, before the material is given its final shape.

36. Process of claim 19 wherein the organic material to be protected is a material selected from the group consisting of acetylcellulose, polyvinylchloride, a poly-α-olefin, a synthetic polyamide and a copolymer of an unsaturated polyester.

37. The process for protecting an organic material which can be damaged by exposure to ultraviolet radiation, said process comprising incorporating in the organic material a member selected from the group consisting of the compounds of the formulae

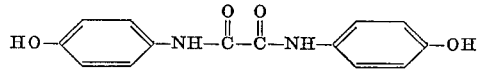

and

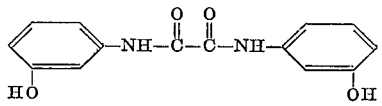

in an amount sufficient to protect said organic material from the influence of ultraviolet radiation.

References Cited

UNITED STATES PATENTS 3,211,562  10/1965  Biland et al. _____ 106—186
3,340,225  9/1967   Dressler et al. _____ 260—45.8

ALLAN LIEBERMAN, Primary Examiner

U.S. Cl. X.R.

117—33.3; 252—300; 260—45.8, 45.9, 558, 559